United States Patent [19]
Chekerylla

[11] Patent Number: 6,084,598
[45] Date of Patent: Jul. 4, 2000

[54] APPARATUS FOR MODIFYING GRAPHIC IMAGES

[76] Inventor: James Chekerylla, 6215 Woodlawn Ave. North, Seattle, Wash. 98103

[21] Appl. No.: 09/064,917

[22] Filed: Apr. 23, 1998

[51] Int. Cl.$^7$ .................................................. G06T 15/50
[52] U.S. Cl. ........................... 345/441; 345/425; 345/427
[58] Field of Search .................................. 345/441, 425, 345/427

[56] References Cited

U.S. PATENT DOCUMENTS 5,748,192  5/1998  Lindholm ................................ 345/425

*Primary Examiner*—Mark R. Powell
*Assistant Examiner*—Lance W. Sealey
*Attorney, Agent, or Firm*—Kenneth Paley

[57] ABSTRACT

A computer system modifies digital images of the human form as well as other objects. The computer system provides intuitive means for accessing warp, smooth, stretch, copy, and paste tools for image modification; undo, toggle and restore tools for change management; and zoom, fit, and full tools for image display sizing.

The computer system is controlled by a program that uses a combination of novel approaches to make image manipulation fast and easy. Buttons are displayed only when they are actually available for use, based on the current system operating mode. The image sizing tools enable an image size change to accomodate the tool size without a required change to the cursor state or to the edit mode state. When regions are defined by the user, the cursor shape changes to indicate whether the cursor is located inside a region, outside the region, and on the region bounding box; allowing a user to perform different operations depending upon cursor location rather than depending upon, and requiring, user executed button pushing as a specific operation. The computer system uses display contexts and bitmap masks that enhance operation speed. Operations are always performed on the full image resolution rather than a displayed image resolution.

86 Claims, 16 Drawing Sheets

APPARATUS FOR MODIFYING GRAPHIC IMAGES

BACKGROUND OF THE INVENTION

This invention relates to both computer based image processing systems having an image processing computer program, and a computer readable medium having an image processing computer program, and specifically to both a computer based system having a computer program for modifying stored and displayed images, and a computer readable medium having a computer program for modifying stored and displayed images.

Computer graphics programs that allow a user to modify digital images are well known in the art. Such systems provide a plethora of image processing tools that are general purpose in nature. The problem is that when the general purpose tools are used for modifying images such as the human face and torso, they are very awkward and time consuming to use. They make it difficult for a user to make fine, detailed changes to the images; such as fine, detailed changes to the human form, such as reshaping parts of the face or torso, removing wrinkles, removing artifacts left over by other operations, and replacing a part of the anatomy with another part of the anatomy. This is because either the tools are too clumsy (e.g., if user tries to change the shape of an eye, the cheek or some other contiguous image is affected as well) or the graphical user interface is too unwieldy (i.e., too many menu selections and/or button hits are required to provide the desired effects).

Existing computer graphics programs require a user to explicitly inform the system executing the computer program, and consequently decision variables in the program, that a certain operational mode is desired. If the user is in a particular mode decides that it is necessary to momentarily execute an alternative mode, the user must command the program to go to the second mode, and when finished, the user is required to communicate via processed state changes that execution control is to return to the previous mode. For example, users often interrupt an image modification procedure in order to zoom. After zooming, the user typically needs to explicitly direct the computer graphics program by system inputs that affect state change variables to return to the previous operational mode. And when a user wants to define a region, stretch that region, and then copy that region over another part of the image and then begin defining a new region, commands are required to be given by the user to affect state change variables between each step.

OBJECTS AND SUMMARY OF THE INVENTION

The present invention overcomes the limitations and shortcomings of the prior art with an improved program for making changes to digital graphical images, such as the human form. General purpose image processing techniques have been refined to provide exactly the precise program-generated controls needed for quickly making fine, controlled changes for the processing of images such as the human head and torso. The present invention provides novel program instructions for making such changes as a plug-in module for standard graphics manipulation packages and as a stand-alone graphics computer program.

The present invention overcomes the limitations of the prior art by eliminating many computer system operator commands previously required when changing modes. Referring to the examples given above in the BACKGROUND OF THE INVENTION section, when the user interrupts an operation to zoom, the user can now resume the prior operation without any additional input. And when the user wants to define a region, stretch that region, and then copy that region over another part of the image and then begin defining a new region, that entire process can be performed with no required intermediate operator commands.

The present invention provides a novel computer system, and medium having a computer program, that modifies digital images by accessing warp, smooth, stretch, copy, and paste tools for image modification; undo, toggle and restore tools for change management; and zoom, fit, and full tools for image display sizing.

The present invention uses a combination of novel programs that make image manipulation both fast and easy. Buttons, or other input and selection mechanisms well known in the art, are only displayed when they are actually available for use, based on the current operating mode of the system. There is no need to change the size of warp boxes or smoothing cursors because the image sizing tools allow the image size to be changed to fit the tool size without changing the cursor state or edit mode state. When regions are defined by the user, the cursor shape changes to indicate when the cursor is located inside a region, outside the region, and on the region bounding box; allowing the user to perform a plurality of different graphic modification operations that depend upon the cursor location rather than depending upon and requiring the user to push a button for a specific operation. And the use of display contexts and bitmap masks offered by the operating environment enhance the speed of the operations. Quality and consistent results are assured with all operations performed at the full image resolution rather than the displayed resolution.

The computer program of the present invention includes a means for displaying at least a portion of a first representation of the digital image on a first area of a display; a second means for displaying at least one selection button, or other input and selection mechanism, for operator selection of graphic control modes; and a third means for providing an operator selection of each graphic mode. The graphic control modes include a warping mode, a smoothing mode, a stretching mode, an image size control mode, a toggle mode, a restore mode, and an undo mode.

The computer program of the present invention further includes a fourth means for displaying at least one sub-control button on a second area of the display.

The sub-control buttons for the warping mode include at least one button for selecting a shape on the display in which warping of the first representation is to occur.

The sub-control buttons for the smoothing mode include at least one button for a shape on the display within which smoothing of the first representation is to occur. The shape within which smoothing can occur may be a predetermined shape as well as a user defined shape. Furthermore, in the smoothing mode, the user is provided with a button selection mechanism for providing a smoothing intensity and a smoothing operation in a sub-portion of the first representation.

The sub-control buttons for the stretching mode include at least one button for indicating a flip display of the stretched and shrunken image.

The computer program of the present invention moreover includes a means for providing a region in which the first representation is stretched, smoothed, and warped.

The computer program of the present invention image size control includes a full resolution size control, a fit image size control, a zoom-in size control, and a zoom-out size control, all upon an operator selection of one of the image size control buttons.

The computer program of the present invention toggle means include providing an operator selection for changing a representation on the first area from a changed representation to an initial representation and upon an operator selection, temporarily displaying the initial representation, upon operator toggle mode button selection.

The computer program of the present invention includes a means for providing an operator selection for changing a first representation on the first area from a changed representation to an initial representation, and displaying the initial representation upon operator selection upon operator restore mode button selection.

The computer program of the present invention undo mode includes providing an operator selection for changing a representation on the first area from a changed representation to the first representation, and displaying at least a portion of the first representation on the display, upon operator election of undo mode button selection The computer program of the present invention moreover provides a warping of the first representation; a smoothing of the first representation in an operator selected shape; a stretching region and a stretching of the first representation within the first representation; a shrinking region and a shrinking of the first representation within the region; a full resolution display of the first representation within the first area; a fitting of the first representation within the first area, a toggling for changing a representation on the first area from a changed representation to an initial representation, and a temporary displaying of the initial representation; a restoration of the first area from a changed representation to an initial representation, and displaying the initial representation; and changing a representation on the first area from a change representation to the first representation, and displaying at least a portion of the first representation on the display; all upon display button selection by the operator.

The above, and other objects, features, and advantages of the present invention will become apparent from the following description read in conjunction with the accompanying drawings, in which like reference numerals designate the same elements.

BRIEF DESCRIPTION OF THE DRAWINGS

For a better understanding of these and other objects of the present invention, reference is made to the DETAILED DESCRIPTION OF THE INVENTION section which is to be read in conjunction with the following drawings, wherein.

DETAILED DESCRIPTION OF THE INVENTION

Definitions of Terms and Concepts

Figure 1:
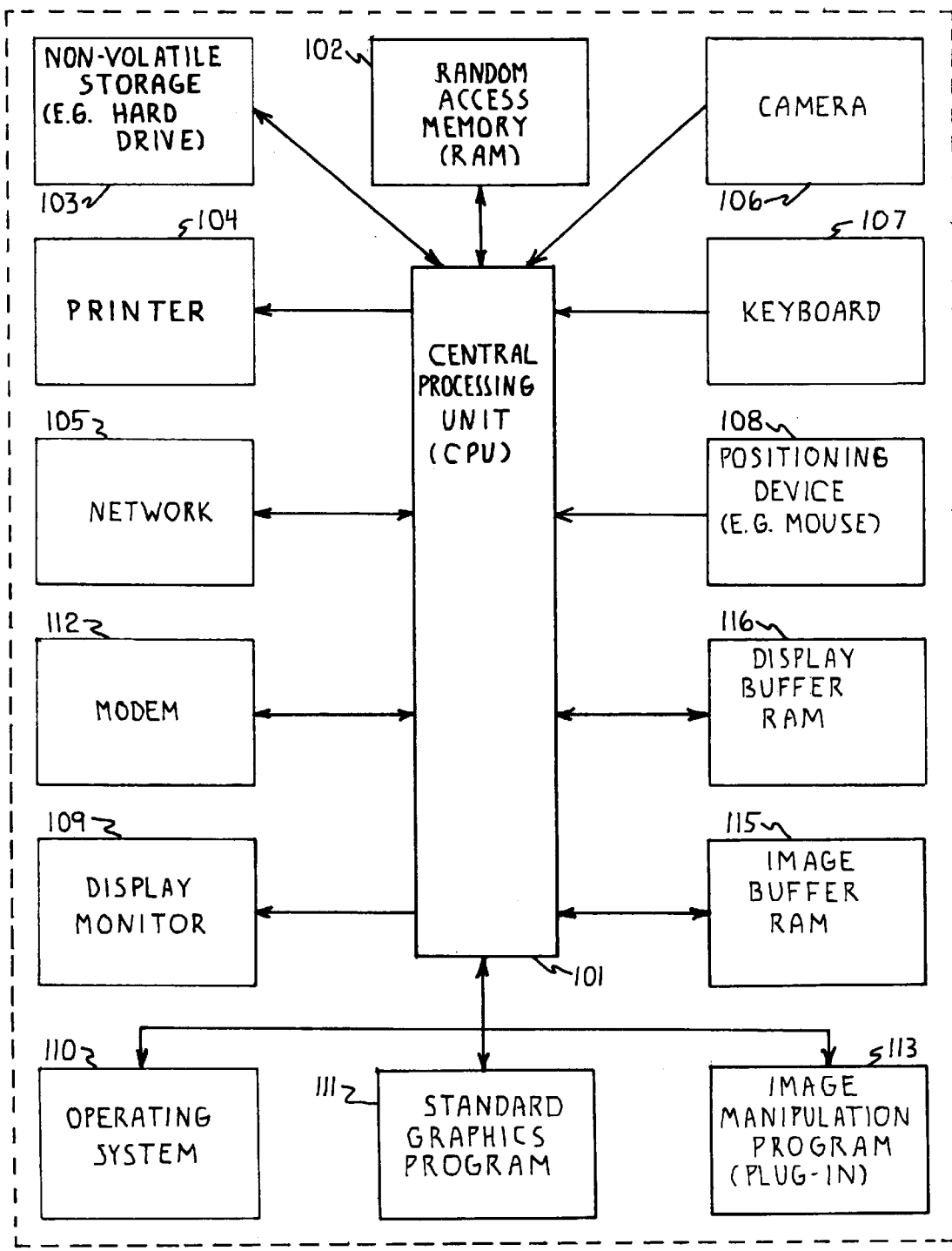
FIG. 1 portrays a block diagram of the preferred embodiment computer system of the invention, and the preferred embodiment computer system for execution of the program of the invention for the plug-in version of the present invention.

This invention comprises both a computer system having a computer program, and as a memory device loaded with that computer program for execution in a computer system. The computer system includes a processor (e.g., an INTEL PENTIUM microprocessor), an operating system (e.g., MICROSOFT WINDOWS 95), a display (e.g., a CRT or a flat panel), a memory (e.g., 16 million bytes of RAM plus some nonvolatile memory such as ROM or flash RAM), a cursor (e.g., an arrow drawn by the computer on the display) that tracks the cursor positioning device, and a cursor positioning device (typically a mouse or a graphics tablet). The image buffer and the graphics buffer are blocks of RAM that are allocated for temporarily storing graphical data. A flag is a word in RAM that is set to a non-zero value, or other predefined value, to indicate an "on" state and is set to zero, or other predefined value, to indicate an "off" state.

The term "graphical user interface" refers to the totality of the graphical representations on a display of the computer system and the manner in which the user uses a positioning device (typically a mouse) to interact with the computer via these representations. This invention has a unique graphical interface that represents an optimum selection of tools required to make alterations to a digital image of the human form. By "optimum" is meant only those tools required and no more (so that the user is not overwhelmed with controls that may not be required for a particular kind of change) and with an organization and design of tools that minimize the operator inputs required to make any change.

The term "tools" refers to a basic capability of the graphics program. In this invention, for example, the four warp tools (that will be described presently) provide the ability to warp within a box of a given shape or to warp within a user-defined region. The three primary tools in this invention include warp, smooth, and stretch. These are commonly accepted terminology and definitions can be found in image processing computer graphics textbooks and articles. But briefly, "warping" is an operation on a rectangle of pixels where one point (or pixel) inside the rectangle is dragged (typically using a mouse) to another point inside a rectangle and all other points inside the rectangle are also moved to maintain their same relative position within the rectangle to the point that was dragged. "Stretching" is an operation on a rectangle of pixels where one edge or a corner (i.e., two edges) are dragged to a new location and all points within the original rectangle are also moved to maintain their same relative position within the new rectangle. "Smoothing" is an operation within a rectangle where each pixel value is replaced by an average of its own value and the values of its neighbors (i.e., with the pixels adjacent to it). In the preferred embodiment, low intensity smoothing uses only the immediate neighbors, moderate smoothing uses neighbors one and two pixels away and high intensity smoothing uses neighbors up to three pixels away. However, any other smoothing method could be used and still remain within the scope of this invention.

The term "control" refers to any possible discrete operator interface input mechanism. In the preferred embodiment, controls are implemented mostly as graphical images of buttons drawn on the display. Controls in the preferred embodiment are also implemented with visual cues provided by various unique cursor shapes so that by simply holding down or clicking the mouse button (the left mouse button in the preferred embodiment if executing under MICROSOFT WINDOWS 95), various unique actions are performed. "Sub-controls" refers to a pop-up graphical display of buttons that offer additional controls for a basic tool. Sub-controls are useful to reduce the clutter and complexity of the user interface because if a user wants to warp, it is unnecessary to show all the smoothing options because they are irrelevant during warping.

Because the preferred embodiment uses only graphical representations of buttons, all subsequent use of the term "button" including the claims will refer to this kind of graphical button (and not the keys on a keyboard). These graphical buttons are typically "pushed" by moving the cursor over the top of the button image and clicking the mouse button. The operating system typically processes these user actions and informs the graphics manipulation program that a particular control button was "pushed". The operating system typically disables buttons by dimming their appearance or otherwise slightly altering their appearance and then ignoring any attempts to "push" them. Alternate embodiments could utilize keys on the keyboard, menus, or other graphical interface entities, mechanisms, and techniques to accomplish the same thing. Other operating systems will support graphically drawn buttons in a different manner. For example, it may not always be possible to know when a button is no longer pushed if the operating system only reports that a button was "pressed" but nothing more. In this case, the software would have to implement a timer or a dual start/stop control to support the momentary display of the original image. Other embodiments may replace these computer generated buttons with substantially equivalent user interface mechanisms such as pull-down menus, physical buttons, keystrokes, etc. The invention and the specification thereof, specifically contemplate alternative interface mechanisms to the "buttons" described herein.

References are made to images and to the changes that are made to an image to produce an altered or modified image. Originally, an image is typically acquired from a disk file or a camera interface. That image will have a certain resolution, e.g., 640 pixels across by 480 pixels high by 16 bits per pixel of color information in typically red-green-blue format. In this case, the full spatial resolution of an image would be 640 pixels by 480 pixels and if the image window (e.g., the window in MICROSOFT WINDOWS 95 in which the image is displayed) is less than this size, then scroll bars are used to allow the entire image to be viewed. If the image window size is greater than the full resolution of the image, then there is unused space in the window when the image is displayed at full resolution. The image may or may not be originally compressed. All processing is performed on an uncompressed copy of the image data stored in random access memory (RAM). The changes that are referred to include such things as the removal of skin wrinkles or the reshaping of a nose. However, it is understood that the program of this invention is applicable to any digital image. When the user of the invention uses the controls to change an image, the values for the pixels in the affected area are replaced with new values in the copy of the image data stored in RAM. The original image data is always available in case the user wants to discard all of the changes made and start again with the original image. Also, whenever a change is made to an image, the entire most recent image data is first copied to an undo buffer so that the user of the invention has the option to discard the most recent change.

The term "region" refers to an area of the image defined by the user using the mouse. The software always closes a region by connecting the start and end points. The system makes the region visible to the user by inverting the pixel pattern of each pixel of the region outline (e.g., hexadecimal 0x0A→0xF5). The region outline is erased by inverting the pixels back to their original values.

The term "closed shape" refers to the graphics technique wherein a user is allowed to define a set of points typically by moving a mouse while depressing the mouse button and when the user releases the mouse button, the start point and the end point are connected, thus creating a closed figure.

The term "graphics framework" refers to any broad-purpose graphics program designed for a wide variety of uses with digital images. Perhaps the best known example is PHOTOSHOP by ADOBE.

This invention includes both a computer system having a computer program that the processor of the computer system executes, and a computer readable medium that is loaded with that computer program for execution by a processor, or alternatively for download into a memory of a computer system. The term "computer readable medium" refers to a program storage apparatus readable by a computer, e.g. a hard disk, a floppy disk, a CD ROM, a RAM, a ROM, or an optical disc. The most conventional way to deliver the program of the invention would be on a computer readable medium such as a CD ROM or diskette, or else downloaded from the Internet into RAM and then saved onto a hard drive.

The preferred embodiment program of this invention is a plug-in operating within a graphics framework provided by a standard graphics program. A "plug-in" is a software library of routines that are invoked at run time in an industry-standard manner by a more general-purpose program. A good example would be a plug-in for the Adobe PHOTOSHOP program running under the MICROSOFT WINDOWS 95 operating system on a computer based on the INTEL PENTIUM processor. The preferred embodiment's cursor positioning device would include a tablet or a mouse. To simplify the text, references will be made to "mouse movements" and "mouse button clicks" throughout the rest of this specification, but any kind of positioning device could be used.

Description of the Preferred Embodiment

This invention is implemented both as a computer system having a computer program loaded in memory, and a computer program loaded into a computer readable medium for execution by a processor of a computer system. An operating system is required for the execution of the program of the invention e.g., MICROSOFT WINDOWS 95 in the case of the preferred embodiment), as well as a general-purpose graphics program (e.g., ADOBE PHOTOSHOP). This general-purpose graphics program is also referred to in the specification as the parent graphics program. The computer program of the invention operates on data such as the image buffer, the display buffer, and numerous flags representing the state of the system. The computer program is typical in that once the calling mechanism is established to allow interfacing with the operating system and graphics framework, the computer program loops, waiting for operator input, and then executes the appropriate execution path depending upon the operator input. For example, flags (memory locations with a preferred value 0 for FALSE and 1 for TRUE) indicate when WARP sub-controls are displayed.

The decision states in the flow charts herein refer to computer program instructions that test the value of a flag and if that value is TRUE, then one path of execution is followed, and if FALSE, another path is followed. There are many other possible execution paths based on CASE or SWITCH statements, IF-THEN-ELSE statements, MACRO expansions, subroutines, object-oriented design, classes, instances, timer-based routines and other control and program organization concepts described in advanced computer programming texts. The following descriptions of the flowcharts describe control flow, the testing of flags, and subroutines, and are presented with the above discussion in mind.

The computer program of this invention in the preferred embodiment is a MICROSOFT VISUAL C++ application built using the MICROSOFT APPWIZARD tool configured for a dialog (for use as a plug-in). For stand-alone operation (i.e., not as a plug-in), then the APPWIZARD would typically be configured for a multiple document interface (MDI) application. Those familiar with the art (i.e., software design engineers with MICROSOFT VISUAL C++ and MICROSOFT Foundation Class (MFC) experience) will recognize and be familiar with this terminology and concept. The application is linked with the shared WIN32 library but can also link in the WIN32 library to trade improved speed against increased memory requirements.

As a plug-in, the computer program of this invention is invoked from the menu of the parent graphics application. And as a stand-alone program, as with any MICROSOFT WINDOWS program, the application is typically invoked by double-clicking an icon that represents the application, or by alternatively opening an image file whose file type has been associated with the invention file name. Once the stand-alone computer program of this invention is opened, the computer program of this invention accepts files either through the file open menu or by files dragged over the window of the computer program of this invention by Dynamic Data Exchange (DDE) communications messages.

The computer program of this invention loops waiting for user inputs in the main message loop of a 32 bit MICROSOFT WINDOWS program. When an input is received, the input message is processed by the "view class" (again, experienced MFC programmers will be familiar with this concept). There are a number of message handlers in the view class that will perform the appropriate processing depending upon the data in the message associated with the user action. A good illustration is the "mouse left button up" message. With MICROSOFT WINDOWS, the operating system informs the program when the user releases the left mouse button. So the program then takes actions such as changing the cursor shape and changing the display characteristics of a graphical image (e.g., a graphical button displayed). Also, the "mouse left button up" message is used to apply warping and stretching changes.

When the user outlines a region for operations in region warping, region smoothing, stretching, and copy and paste, the computer program of this invention performs all image manipulation processing on rectangular portions of the image and uses bitmap masks to apply the changes to an irregular section of the whole image. The masking operation makes use of the capabilities of the MICROSOFT WINDOWS graphics libraries for display contexts (DC's). By performing logical AND and OR operations against the original image, the rectangle of the image that contains the user-defined region, and a rectangle that contains just the region outline, the region can be warped, smoothed, stretched, and dragged to new locations of the original image. And when images are dragged around the display using the drag capability in the stretch operation, the MFC ImageList class is used.

Scroll bars are required whenever an entire image cannot be displayed. When the DCs performs zooming, the program compares the current window size to the window size required and displays or removes the scroll bars independently for the horizontal or vertical dimensions using MICROSOFT WIN32 and MFC calls.

The computer program of this invention performs all graphical operations at full image resolution. If the image is zoomed and the user outlines a user-defined region on a zoomed image, the program will scale the points of the user-defined region to match the scale of the full size image. Then the operation is performed on the full size image data. Then, when the operation is complete, the image or portion of the image is redisplayed using the appropriate zoom factor. This greatly simplifies all operations on zoomed images.

The computer program of this invention supports the "undo" operation by saving a copy of the current image state in a pre-allocated RAM buffer before any change is applied to the current image. Then if the user wants to back a change out, the program copies the saved image back over the current image in RAM and sets a flag indicating that the undo buffer is no longer active (i.e., it does not contain usable information). This flag is also used to disable the undo button so that the user is not allowed to use the undo button until the user makes another change to the image and the undo buffer is re-loaded.

The appearance of graphically-displayed buttons is changed during idle mode (i.e., when the program is not processing any other messages). During idle mode, MICROSOFT WINDOWS sends messages to the program's view class for each control and if there is a handler for that message, then the handler sends WINDOWS a message to enable or disable the control. This is how the computer program of this invention disables the undo control when it does not contain usable information.

Most graphics superimposed on the image are done so using the XOR (exclusive OR) operation. With the XOR operation performed on the display buffer, a subsequent XOR operation returns the display to its prior, normal state. This is the approach that allows the warp boxes to be quickly drawn and erased.

Referring to FIG. 1, a computer system 114 has an operating system 110 and a program 111 for providing a graphical interface and framework for the plug-in image manipulation program 113 of the invention (i.e., the application). A hard drive storage device 103 stores the plug-in image manipulation program 113. A central processing unit (CPU) 101 executes the graphics program 111 from a RAM 102, loads the image manipulation program 113 into the RAM 102 under program control of the graphics program 111, and executes the graphics image manipulation program 113 from the RAM 102. It is understood to those skilled in the art that the image manipulation program 113 is alternatively storable on a nonvolatile storage device other than the hard drive storage device 103, and alternatively accessible to the computer system 114 from a network through an interfacing hardware device such as a modem 112. A camera 106, having an imager, or alternatively a network 105, the hard drive or other nonvolatile storage device 103, provides a digital image that the computer system 114 transforms under the program control of the image manipulation program 113 in a manner that shall be described presently. The digital image is loaded into the RAM 102 by program execution of the graphics program 111 as image data for the image manipulation program 113. A monitor 109 displays a user interface of the image manipulation program 113 and an image of the digital image, in a manner that shall be described presently.

A cursor positioning device 108 provides cursor control to the image manipulation program 113 for selection of display buttons, to be described presently, and identification of portions of a displayed image, to be described presently. The cursor positioning device 108 in the preferred embodiment is a mouse, but it is understood that any digitizing device that interfaces with the computer system 114 is satisfactory. A character input device provides character data to the computer system 114 for input into the RAM 102 as data for the image manipulation program 113 and graphics program 111. The character input device is a keyboard 107 in the preferred embodiment. The character data input includes image manipulation program file names. An operator of the image manipulation program 113 makes changes to displayed images by operation of the computer system 114 in a manner that shall be presented presently. The operator saves displayed image data on the hard drive storage device 103 and RAM 102, and prints image data on a printer 104 by execution of the graphics program 111. A display buffer 116 stores a memory representation of temporary image data, to be explained presently. An image buffer 115 stores a memory representation of a reference copy of a specific image display, to be presented presently.

Figure 2:
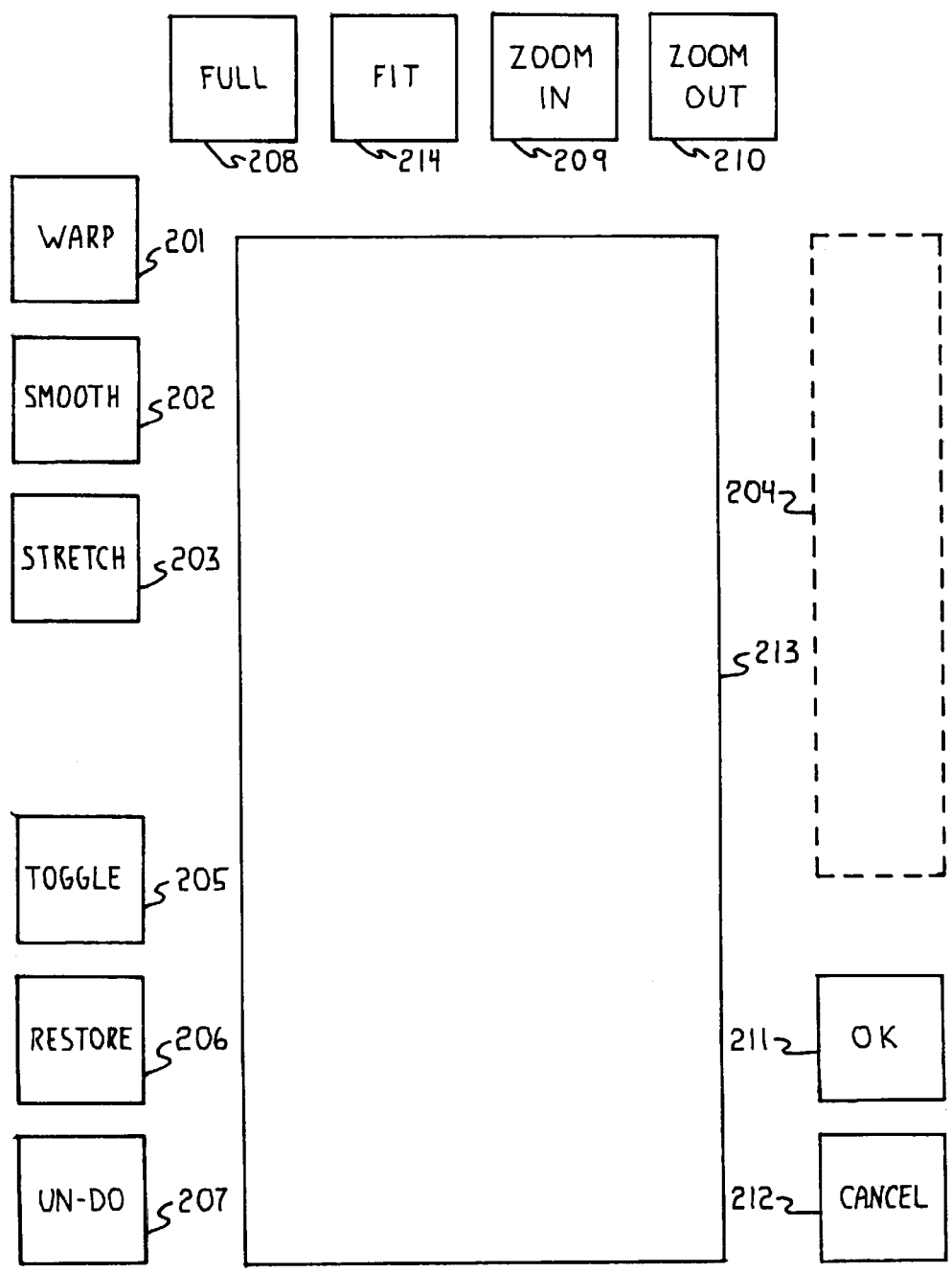
FIG. 2 portrays the preferred embodiment sample display layout showing the controls necessary for image manipulation.

The graphics image manipulation computer program of this invention 113 includes instructions that provide a display for operator selection of modes graphically. Referring to FIG. 2, a typical display layout for the preferred embodiment is shown. The application does not display menus but rather, displays all user controls as buttons drawn on the display or derives user commands from mouse operations. (But in a stand-alone embodiment, menus are also provided for file input/output, online help and other typical Windows operations). The application draws cursor shapes that reflect the action to be taken if the mouse button is clicked or held down as the mouse is moved. The three primary mode controls are WARP 201, SMOOTH 202 and STRETCH 203. When any of these three controls are invoked, the application displays sub-controls in the area 204, as previously presented.

The computer program of this invention (referred to as 113 in FIG. 1) includes instructions that provide a TOGGLE control 205 to momentarily display the original image in order to allow the user to easily see the changes that have been made. If the operating system supports both button-up and button-down messages to the application programs, the application displays the original image as long as the button is "pushed" (i.e., as long as the mouse button remains depressed while the cursor is over the button). Otherwise, the application utilizes a timer or a dual start/stop control to support momentary displays of the original image.

The computer program of this invention (referred to as 113 in FIG. 1) includes instructions that provide a RESTORE control 206 to discard all changes and redisplay the original image. The application disables the RESTORE control during idle mode as described above if no changes have yet been made or immediately after this control has been used.

The computer program of this invention (referred to as 113 in FIG. 1) includes instructions that provide an UNDO control 207 to reverse the most recent change made. The application disables the UNDO control after each use during idle mode as described above and before the first change to the image is made.

The computer program of this invention (referred to as 113 in FIG. 1) includes instructions that provide ZOOM-IN, ZOOM-OUT, FULL VIEW, and FIT controls that change the display resolution of the image but do not affect the size of the window in which the image is displayed. The ZOOM-IN control 209 increases the size of the image (details in an image appear larger) by some fixed percent (e.g., 10%) and cause scroll bars to be added to the right side and bottom of the image area 213 if either dimension of the displayed image exceeds the window size. The ZOOM-OUT control 210 decreases the size of image features by the same percent as ZOOM-IN and eliminates one or both of the scroll bars when they are no longer needed. The user has the ability to adjust the zoom percent from its default setting. The FULL VIEW control 208 returns the image to its original size and horizontal and/or vertical scroll bars are added or removed as required. The FIT control 214 displays the image at whatever resolution is required to fill one dimension of the image window without exceeding the other dimension (the aspect ratio of the image is always preserved). With FIT, any scroll bars will always be removed. The fact that the application does not include instructions that change the mode of the system during zooming is an important factor that speeds the user interface and eliminates needless keystrokes required in other systems. In other systems, the user may be warping and if the user decides to zoom, the user will have to tell the system that he/she wants to resume warping by clicking a button. With this invention, after any number of zooms, the system is still in the same warping mode as before and no button clicks are required to resume warping (or smoothing or stretching).

The computer program of this invention (referred to as 113 in FIG. 1) includes instructions that provide an OK control 211 to allow the user to accept any changes made and return to the parent graphics application while the CANCEL control 212 is provided by the application so that the user can return to the parent graphics application without making any changes to the original image. Other embodiments could show these items rearranged and controls grouped together or split apart. However, in the preferred embodiment, the control layout described offers the best combination of ease-of-use and the minimal number of controls for the user to learn to deal with.

Figure 3:
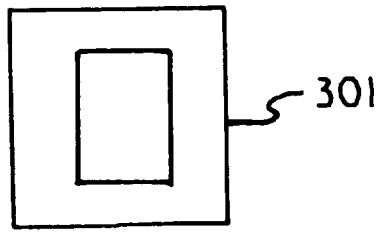
FIG. 3 portrays the preferred embodiment sample display layout for the warp function's sub-controls.
Figure 3:
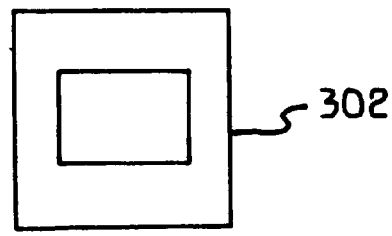
Figure 3:
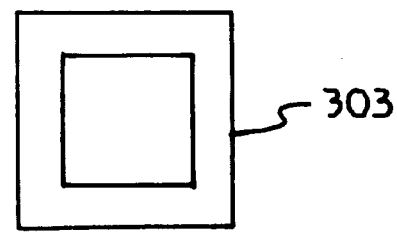
Figure 3:
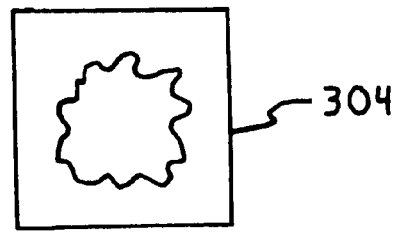

Referring to FIG. 3, the computer program of this invention (referred to as 113 in FIG. 1) includes instructions that provide WARP sub-controls that appear in the area 204 in FIG. 2 when the WARP control 201 (in FIG. 2) is selected.

The program uses the VERTICAL BOX control 301 to confine warping to a fixed size vertical rectangle with a 2:1 aspect ratio. The program uses the HORIZONTAL BOX control 302 to confine warping confine to a fixed size horizontal rectangle with a 2:1 aspect ratio. The program has the SQUARE BOX control 303 to confine warping to a fixed size square (a 1:1 aspect ratio). If the size of the rectangle is not appropriate for the image detail to be warped, the program instructions provide the zoom controls to allow the user to first zoom the image in or out before using the warp control. Also, the default box dimensions can be changed by the user.

Figure 4:
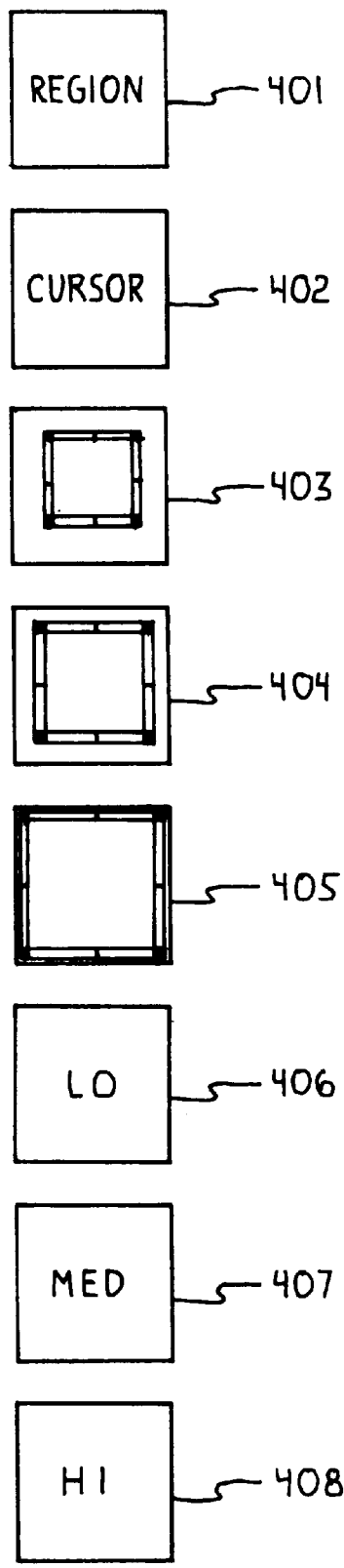
FIG. 4 portrays the preferred embodiment sample display layout for the smooth function's subcontrols.

Referring to FIG. 4, the computer program of this invention (referred to as 113 in FIG. 1) includes instructions that provide SMOOTH sub-controls that appear in the area 204 in FIG. 2 when the SMOOTH control 202 (in FIG. 2) is selected. Smoothing is performed in a user-defined region or in cursor mode. The program has instructions that provide the RGN control 401 to allow region mode to be selected and the CURS control 402 to allow cursor mode to be selected. The program instructions allow three cursor sizes 403, 404, 405 and three intensities 406,407,408 to be selected. In the preferred embodiment, the intensities actually refer to the neighborhood size used in the smoothing process.

Figure 5:
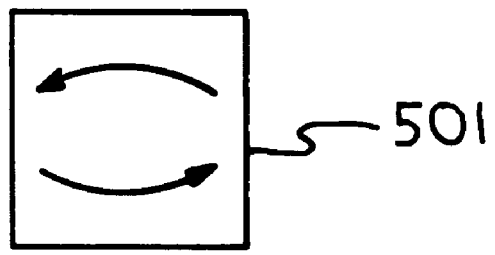
FIG. 5 portrays is the preferred embodiment sample display layout for the stretch function's sub-controls.

Referring to FIG. 5, the computer program of this invention (referred to as 113 in FIG. 1) includes instructions that provide STRETCH sub-controls that appear in the area 204 in FIG. 2 when the STRETCH control 203 (in FIG. 2) is selected. The only sub-control required in STRETCH mode is the FLIP control 501 used by the program to rotate an image region around a vertical axis.

Figure 6:
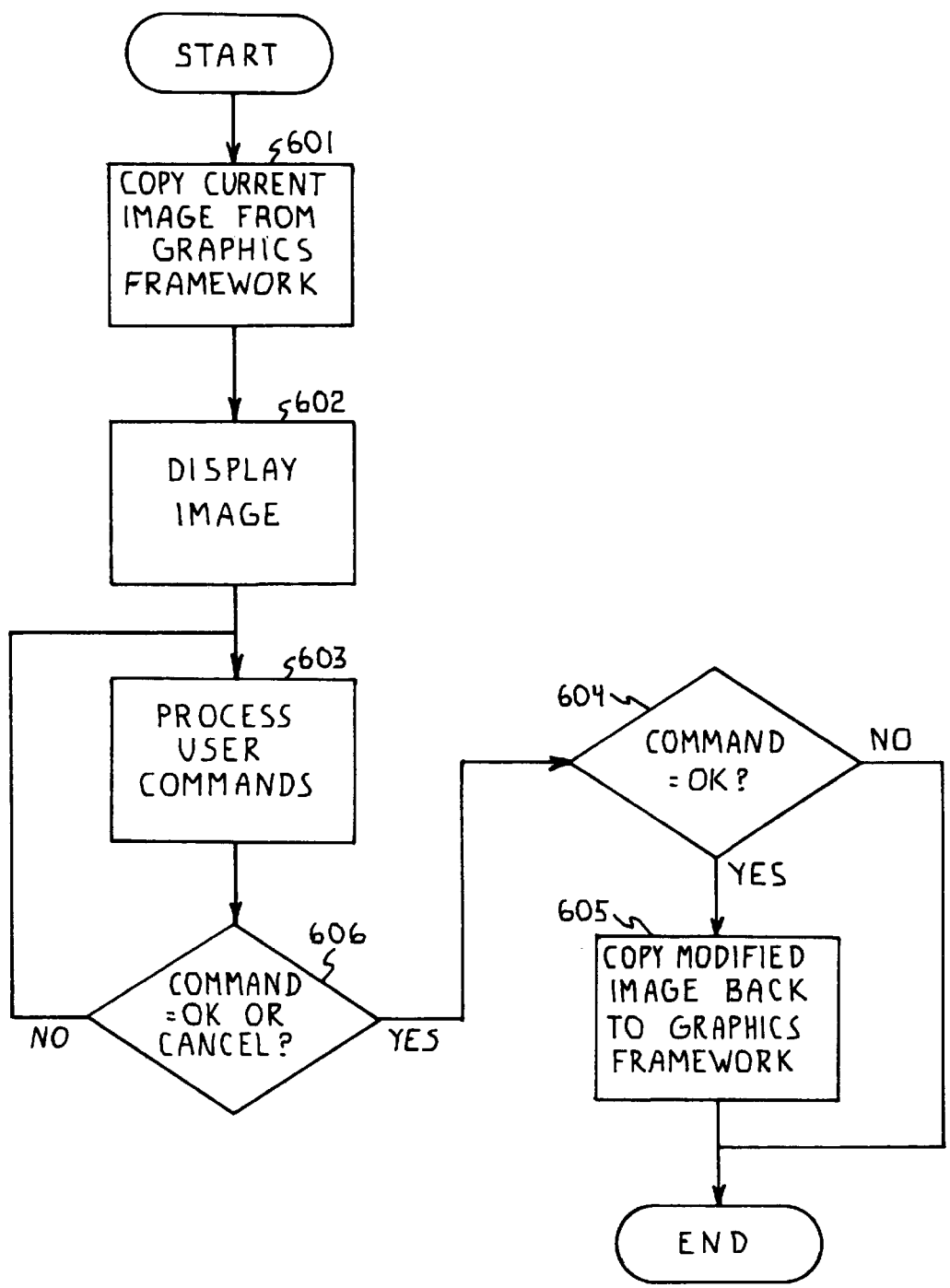
FIG. 6 portrays is the preferred embodiment main program flowchart.

Referring to FIG. 6, the top-level program flow is shown for the preferred embodiment with the graphics manipulation program (referred to as 113 in FIG. 1) implemented as a plug-in. When the program is invoked, its executed instructions first create a copy of the currently-active image of the calling graphics application 601 and cause this image 602 to be displayed. Then, the user's commands are processed 603 (see FIG. 7) until the user selects either OK or CANCEL 606. If the user terminates the program with OK 604, then the application copies the modified image back to the graphics manipulation program 605.

Figure 7:
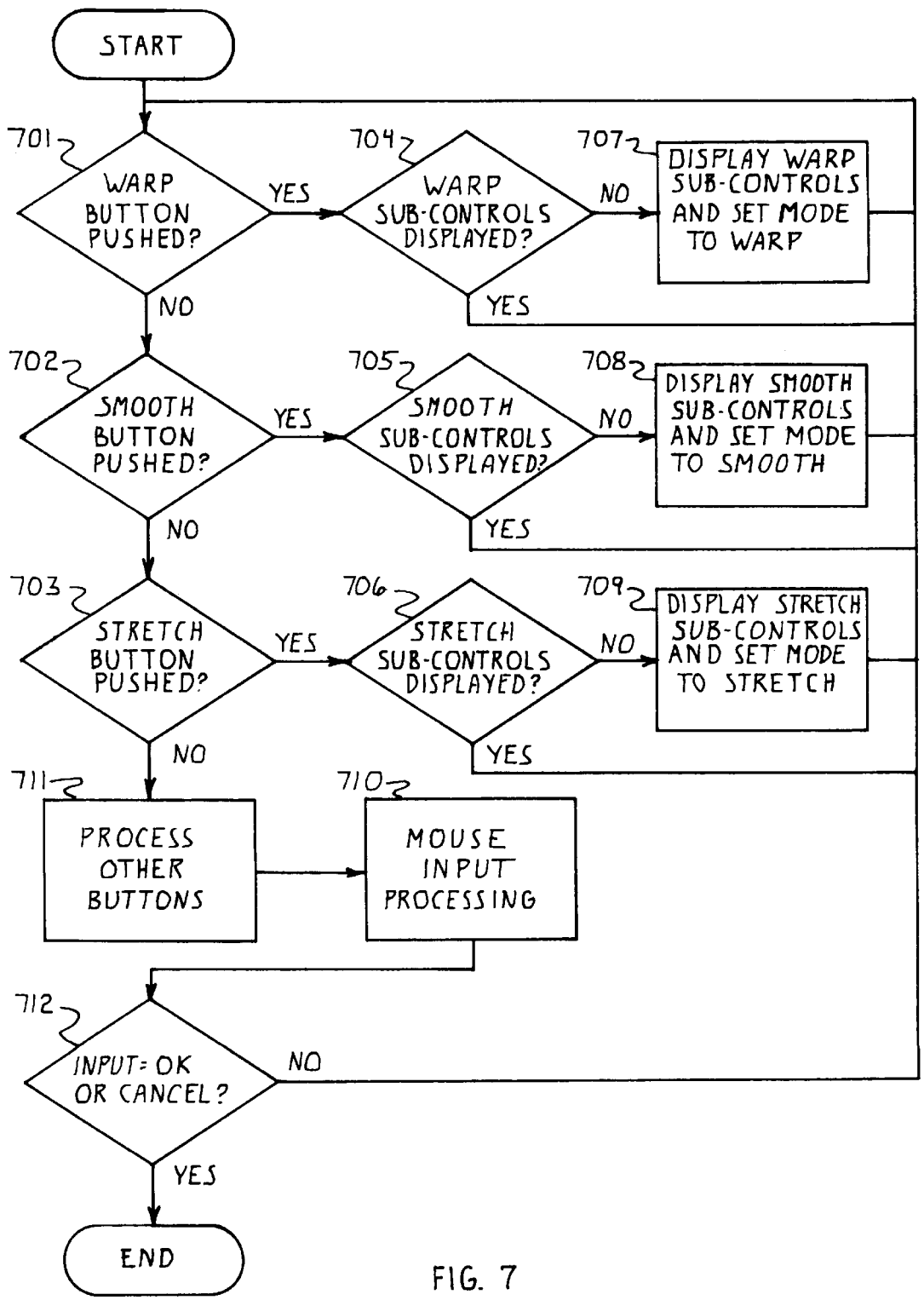
FIG. 7 portrays the preferred embodiment flowchart that provides additional program flow details for processing operator commands for setting up warp, smooth and stretch modes.

Referring to FIG. 7, the computer program of this invention (referred to as 113 in FIG. 1) includes instructions that provide a processing of user commands (referred to in 603 of FIG. 6). If the WARP button is pushed 701 and the WARP sub-controls are not displayed 704, then the WARP sub-controls are displayed by the program in the region set aside for the sub-controls 204 (of FIG. 2). If the SMOOTH button is pushed 702 and the SMOOTH sub-controls are not displayed 705, then the SMOOTH sub-controls are displayed by the program in the region set aside for the sub-controls 204 (FIG. 2). If the STRETCH button is pushed 703 and the STRETCH sub-controls are not displayed 706, then the STRETCH sub-controls are displayed by the application in the region set aside for the sub-controls 204 (in FIG. 2). If none of these three major mode buttons are selected, then any other button inputs are processed 711 (see FIG. 8) by the programs instructions and the mouse inputs are processed 710 (see FIG. 9) by the program. (Note that the application's control logic varies with operating system because button hits and mouse movements might be delivered differently to application but this is a detail that does not impact the basic concept of the invention.) Finally, the program loops continuously processing user commands until either OK or CANCEL 712 is selected by the user.

Figure 8:
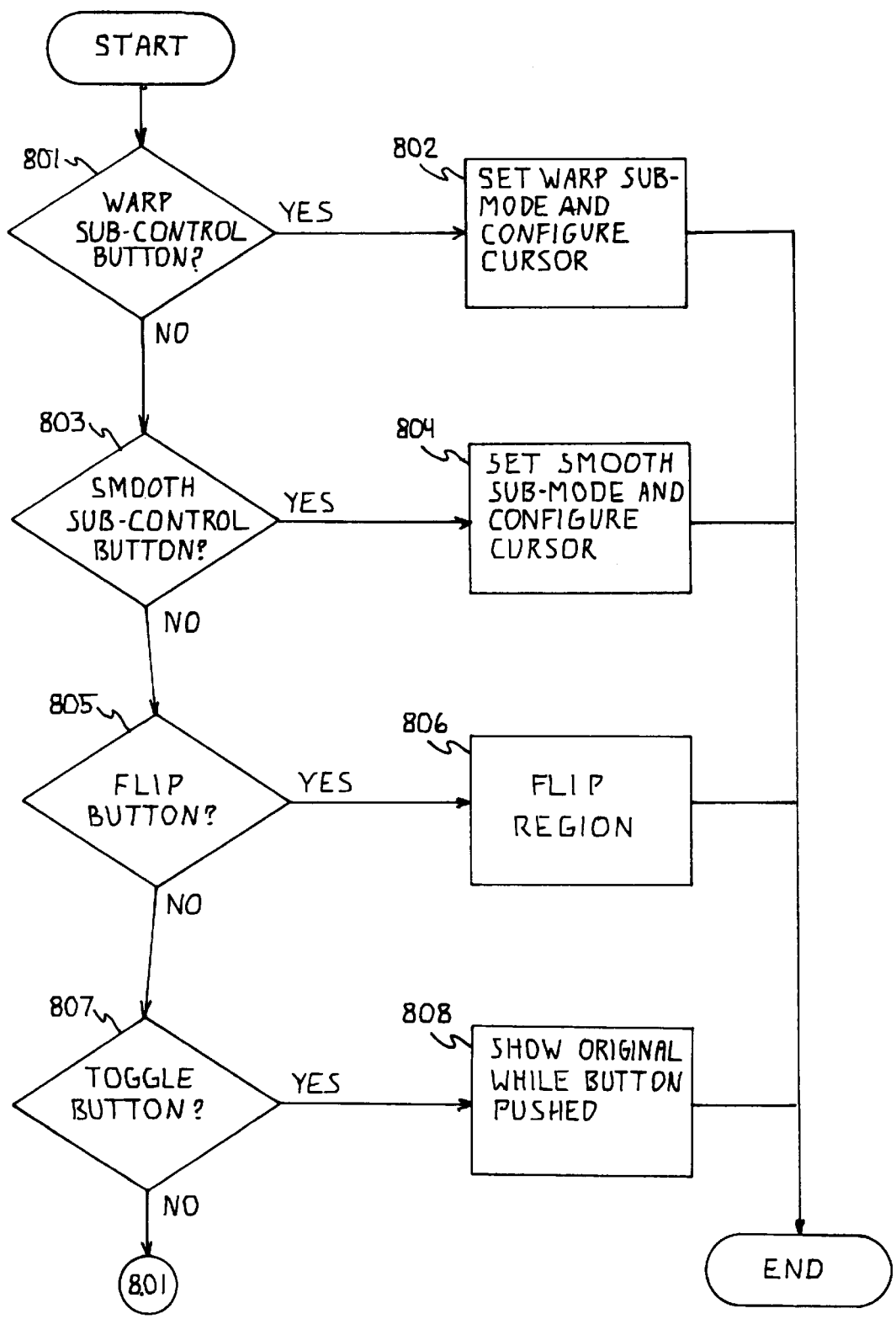
FIG. 8 portrays the preferred embodiment flowchart that provides additional program flow details for processing the remaining user commands (other than setting up warp, smooth and stretch modes).
Figure 8:
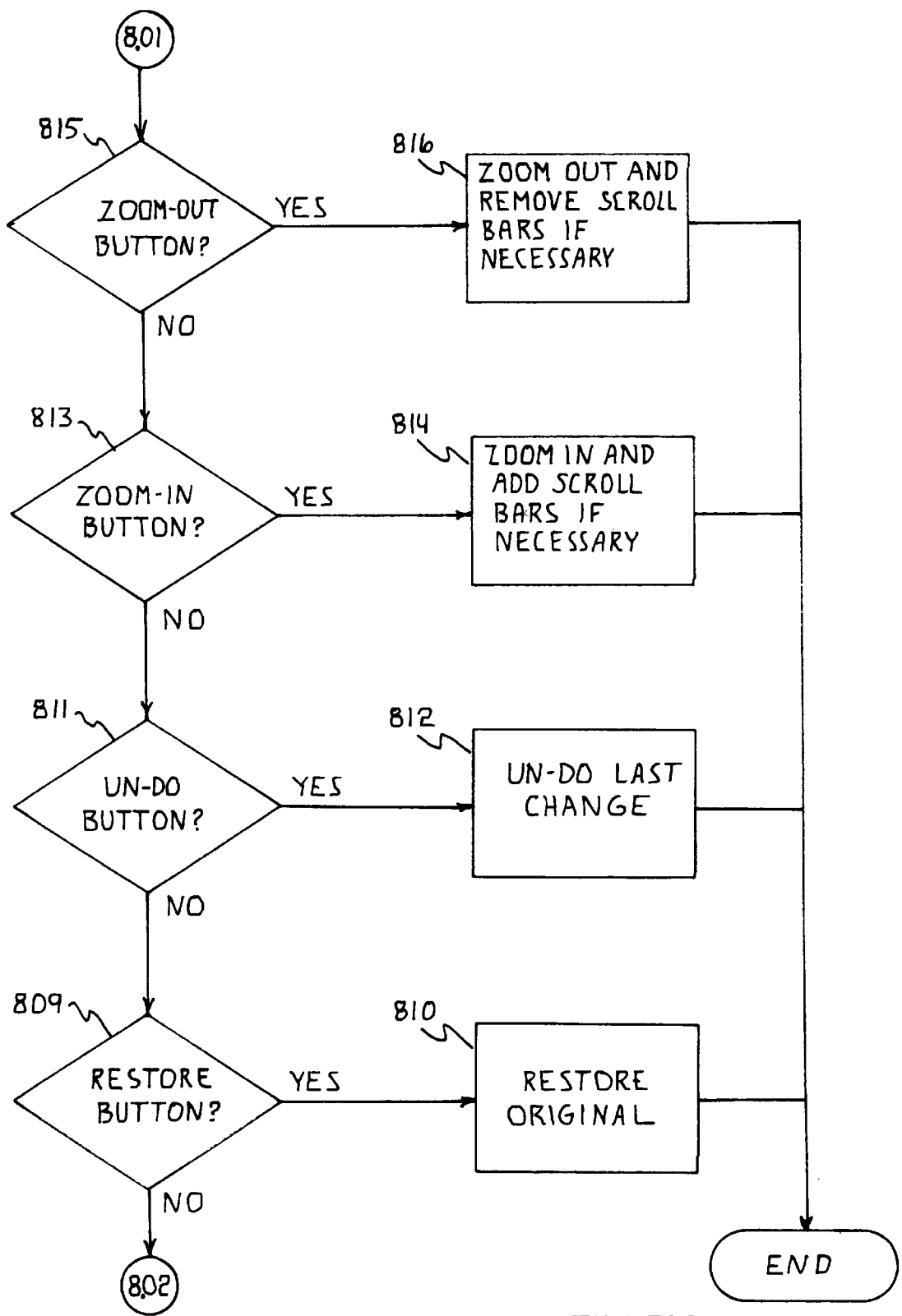
Figure 8:
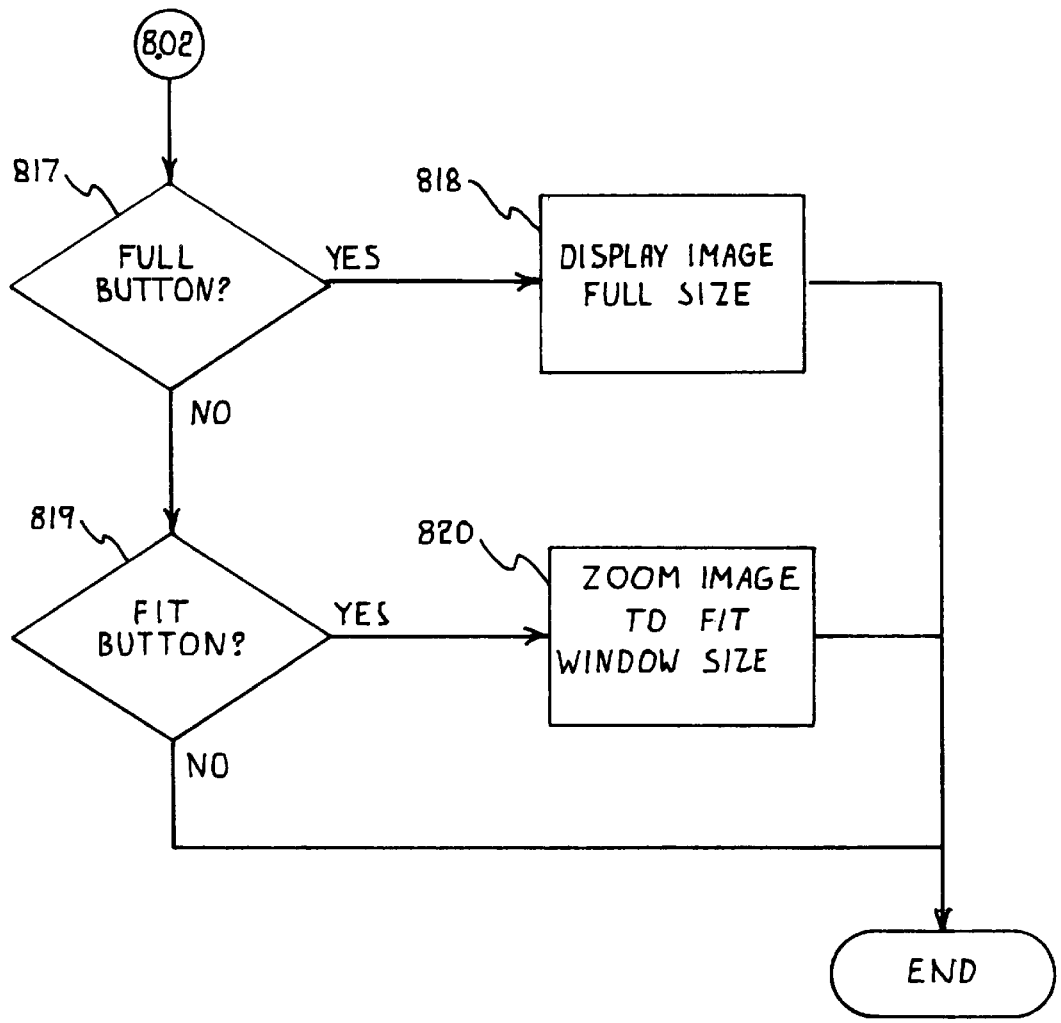

Referring to FIG. 8, the computer program of this invention (referred to as 113 in FIG. 1) includes instructions that provide processing of other buttons (referred to in 711 of FIG. 7). WARP sub-controls 801 cause the appropriate mode flags to be set and the appropriate cursor graphic to be selected 802 by the program. Likewise, SMOOTH sub-controls 803 cause the appropriate mode flags to be set and the appropriate cursor graphic to be selected 804 by the program. The FLIP control 805 results in the region outlined being flipped around the vertical axis 806 by the program. The TOGGLE control 807 results in the original, unaltered image being displayed while the TOGGLE control is depressed 808 (if the operating system supports button-up messages) by the program. The RESTORE control 809 results in the original, unaltered image replacing the current altered image 810. If there is no difference between the original and the current image, the TOGGLE and RESTORE controls are disabled by the program. The UNDO control 811 results in the most recent change being backed out 812 by the program. If no changes have yet been made or if RESTORE or UNDO has just been performed, the UNDO control is disabled by the program. The ZOOM-IN control 813 results in the image being displayed by the program such that features appear 10% larger and scroll bars are added if necessary to be able to view the entire image 814. If the image has already been zoomed to its maximum, the ZOOM-IN control is disabled by the program. The ZOOM-OUT control 815 operates in reverse of the ZOOM-IN control and shrinks image details by 10% until the minimum image size is reached, at which point, the ZOOM-OUT control is disabled 816 by the program. ZOOM-OUT removes scroll bars when they are no longer needed. The FULL 817 control returns the image size to its full size 818. The FULL control is disabled by the program whenever the image is displayed at its full size. The FIT 819 control zooms the image to whatever amount necessary so that the image size along one dimension fits exactly within the image window and the other dimension of the image fits within the image window 820.

Figure 9:
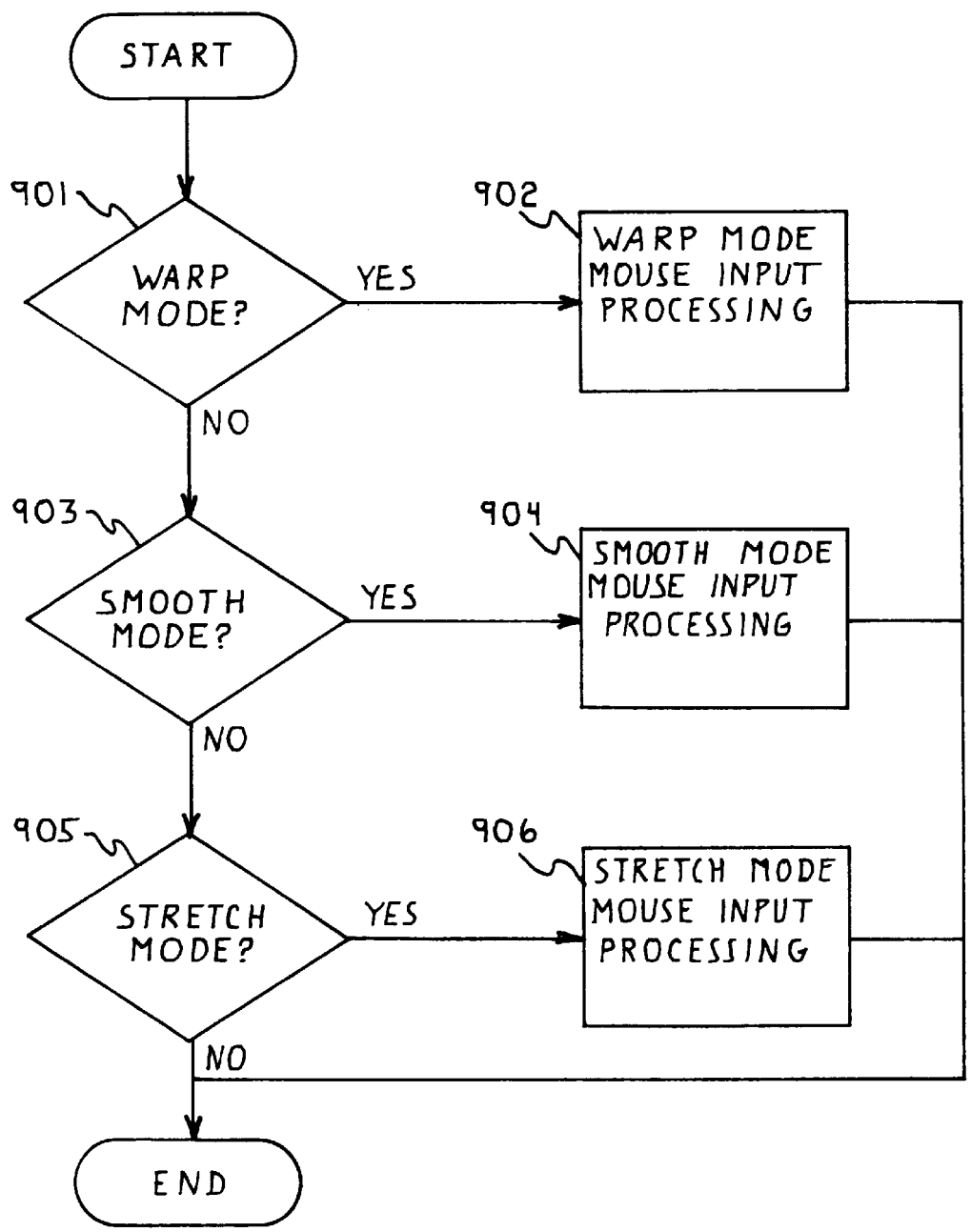
FIG. 9 portrays the preferred embodiment flowchart that provides additional program flow details for high level mouse input processing.

Referring to FIG. 9, the computer program of this invention (referred to as 113 in FIG. 1) includes instructions that provide a processing of mouse inputs (referred to in 710 of FIG. 7). The application operates in one of three main modes: warp, smooth, or stretch. If the application is in warp mode 901, warp mode mouse input processing instructions are invoked 902 (see FIG. 10) to offer the user the sub-controls for warp box or region warping and also select a default (the last box type selected) and set the correct cursor shape so that warping can begin immediately with no further button hits required. If the program is in smoothing mode 903, smoothing mode mouse input processing instructions are invoked 904 (see FIG. 11) to offer the user the sub-controls for cursor and region smoothing and also select a default (the last smoothing type selected) and set the correct cursor shape so that smoothing can begin immediately with no further button hits required. If the program is in stretch mode 905, stretch mode mouse input processing instructions are invoked 906 (see FIG. 12) to offer the user the sub-control for region flipping and set the correct cursor shape so that stretching and copying can begin immediately with no further button hits required.

Figure 10:
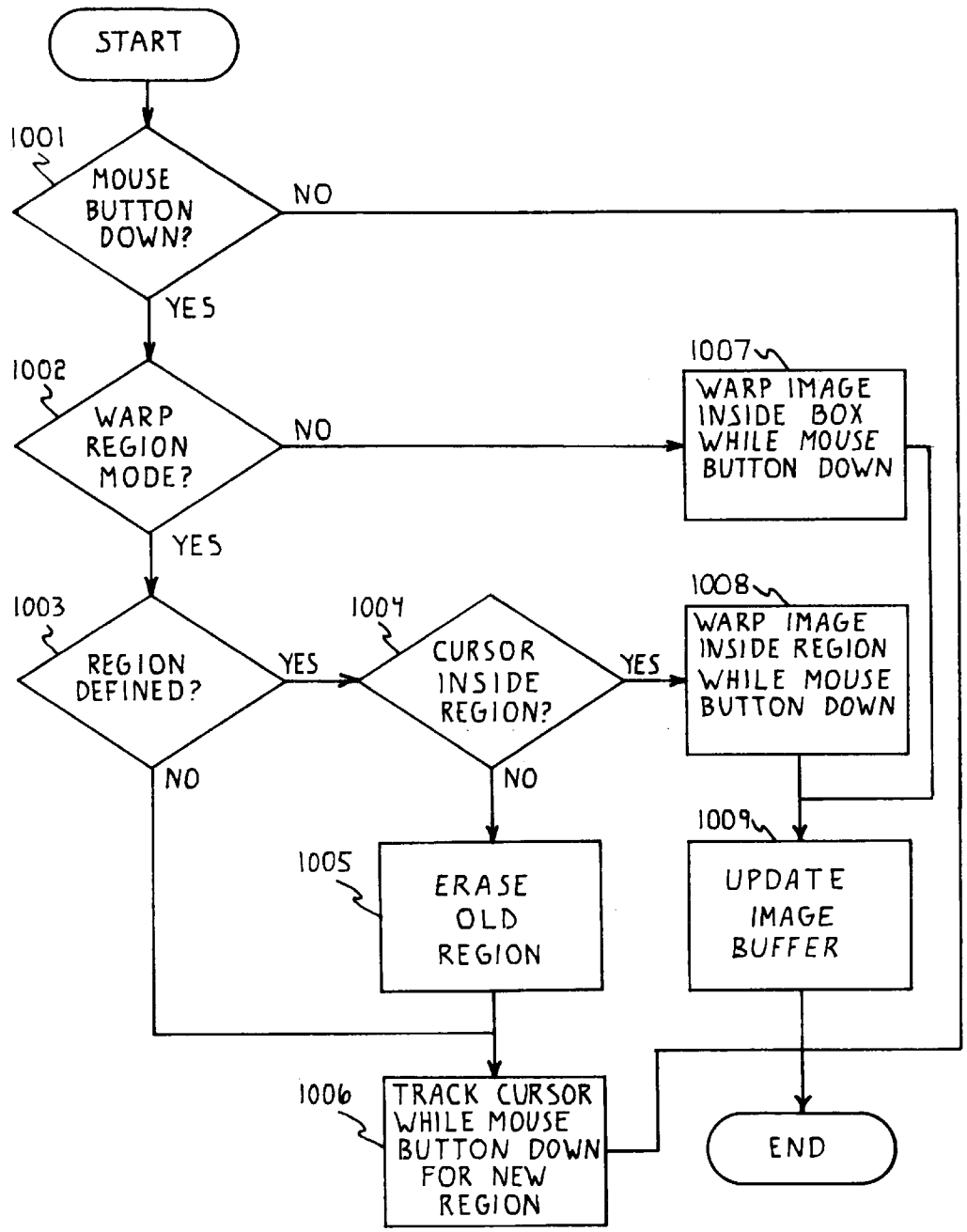
FIG. 10 portrays the preferred embodiment flowchart that provides additional program flow details for warp mode mouse input processing.

Referring to FIG. 10, the computer program of this invention (referred to as 113 in FIG. 1) includes instructions that provide a processing of warp mode mouse inputs (referred to in 902 of FIG. 9) is shown. The display buffer is updated by the program to show warping while the cursor is being tracked and when the mouse button is released, the final warp state of the image is saved to the image buffer. If the mouse button is not pressed, no processing is done 1001 by the application. Otherwise, if the mode is region warping 1002, and the region is not yet defined 1003, a region is defined by the program instructions that provide a tracking of the cursor movement until the mouse button is released 1006. If the region is already defined 1003 and the cursor is outside of the region 1004, the existing region is erased 1005 and a new region is defined by the program instructions that provide a tracking of the cursor movement until the mouse button is released 1006. If the region is already defined 1003 and the cursor is inside the region 1004, warping is performed by the program within the region as the cursor is moved until the mouse button is released 1008. If the warp mode is not region warping 1002, then warping is executed by program instructions within a fixed-size box (with its shape determined by the currently selected warp sub-control) as the cursor is tracked until the mouse button is released 1007. When either type of warping terminates as the mouse button is released, the image changes are copied by the program to the image buffer 1009.

Figure 11:
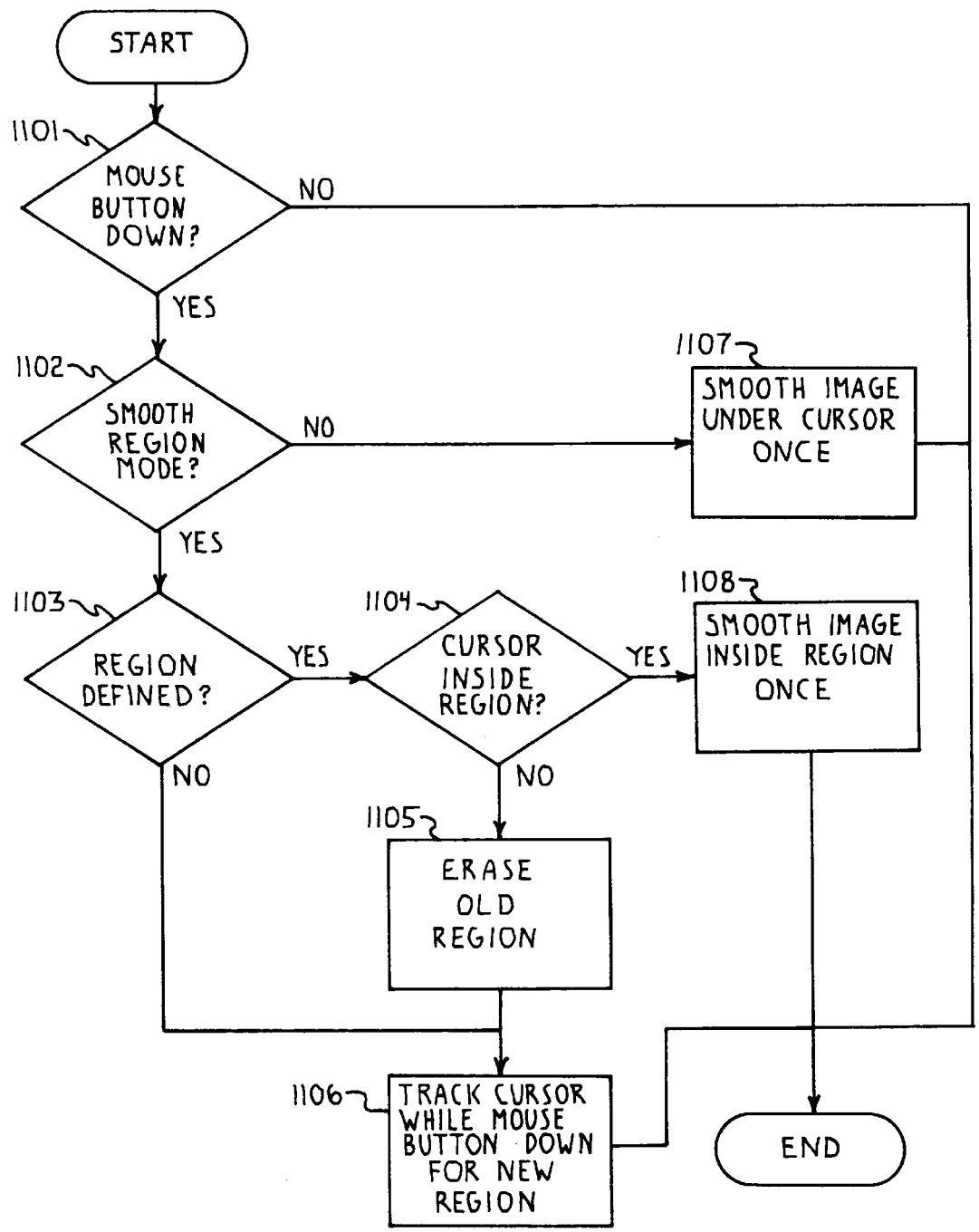
FIG. 11 portrays the preferred embodiment flowchart that provides additional program flow details for smoothing mode mouse input processing.

Referring to FIG. 11, the computer program of this invention (referred to as 113 in FIG. 1) includes instructions that provide a processing of smoothing mode mouse inputs (referred to in 904 of FIG. 9). The image buffer is updated by the executed instructions of the program with each smoothing operation. If the mouse button is not pressed, no processing is done 1101 by the program. Otherwise, if the mode is region smoothing 1102, and the region is not yet defined 1103, a region is defined by the program tracking the cursor movement until the mouse button is released 1106. If the region is already defined 1103 and the cursor is outside of the region 1104, the existing region is erased 1105 and a new region is defined by the program tracking the cursor movement until the mouse button is released 1106. If the region is already defined 1103 and the cursor is inside the region 1104, smoothing is performed by the program within the region once 1108. If the smoothing mode is not region smoothing 1102, then smoothing is done by the program within a fixed-size box (with its shape and intensity determined by the currently selected smooth sub-control) 1107. With this new, and innovative cursor smoothing mode, the user actually sees what smoothing is taking place as it is done because the program provides a cursor which is a frame with a transparent inside section (see FIG. 2, items 403 to 405). Also, the intensity of the smoothing is adjusted by the application analogous to the intensity of a plastic surgery laser skin resurfacing device which is another innovative concept (see FIG. 2, items 406 to 408).

Figure 12:
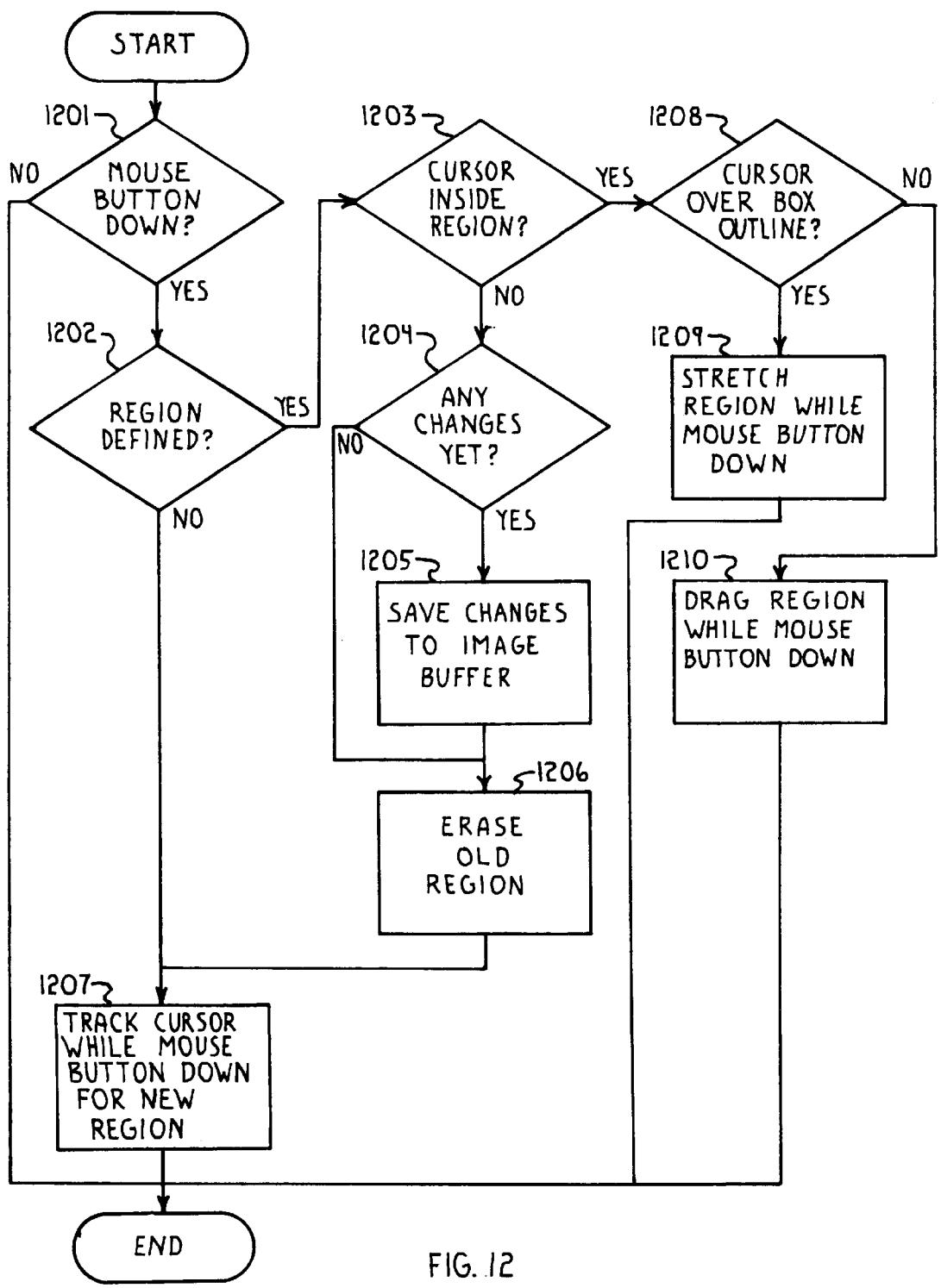
FIG. 12 portrays the preferred embodiment flowchart that provides additional program flow details for stretch mode mouse input processing.
Figure 13:
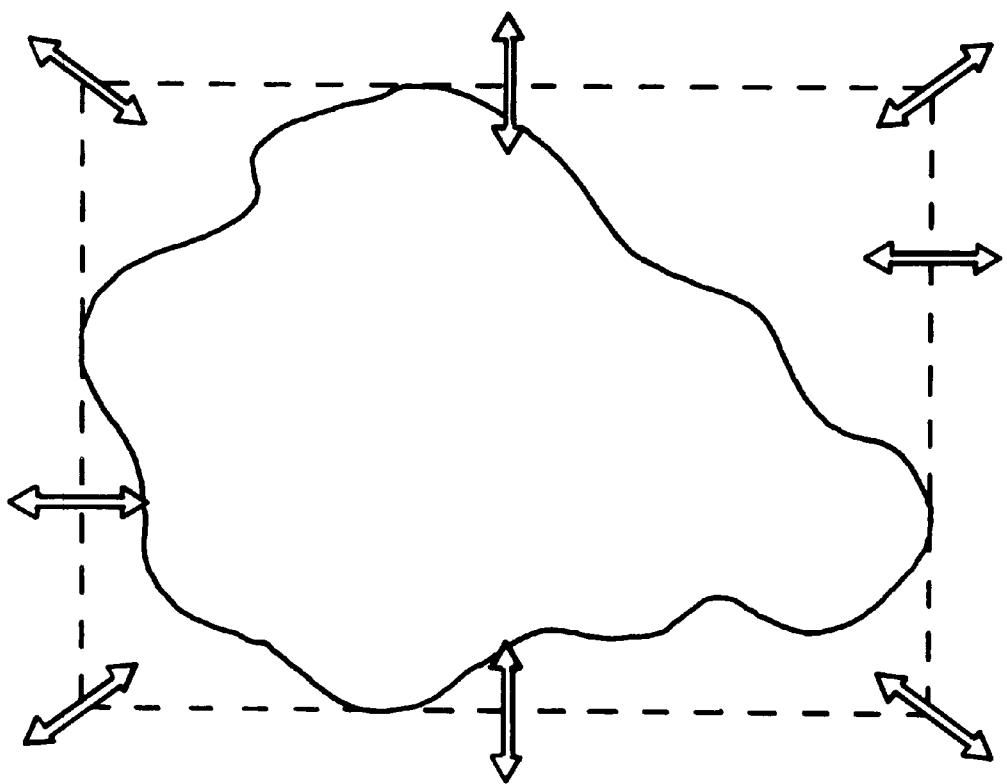
FIG. 13 portrays a region stretched in one of eight directions if the cursor is over the box outline according to the flowchart of FIG. 12.

Referring to FIG. 12, the computer program of this invention (referred to as 113 in FIG. 1) includes instructions that provide a processing of stretch mode mouse inputs (referred to in 906 of FIG. 9). This mode also includes region copy using drag and drop and flip operations on a region. The display buffer is updated by the instructions of the program to show stretching, copying, and flipping while the cursor is being tracked and when the mouse button is released with the cursor outside of the box containing the region, the final state of the image if modified is saved to the image buffer. If the mouse button is not pressed, no processing is done 1201 by the program. Otherwise, if a region is defined 1202 and the cursor is not inside a box that contains the region 1203, and changes have been made (i.e., stretching, copying or flipping) 1204, then the changed image is copied by the application to the image buffer 1205. Then the old region is erased 1206 by the program and the cursor is tracked until the mouse button is released to define a new region 1207. If a region is defined 1202 and the cursor is not inside a box that contains the region 1203, and no changes have yet been made (i.e., stretching, copying or flipping) 1204, then the old region is erased 1206 by the program and the cursor is tracked until the mouse button is released to define a new region 1207. If no region is defined 1202, the cursor is tracked by the program until the mouse button is released to define a new region 1207. If a region is defined 1202 and the cursor is inside a box that contains the region 1203, and the cursor is over the outline of the box 1208, then the cursor is tracked by the program and the region is stretched in one of 8 directions (FIG. 13) until the mouse button is release 1209. If a region is defined 1202 and the cursor is inside a box that contains the region 1203, and the cursor is not over the outline of the box (therefore the cursor is inside the box) 1208, then the cursor is tracked by the program and the region is copied and dragged until the mouse button is release 1210. This approach is new and innovative in that region definition, stretching, copying and dragging are all performed by the program without any need to push buttons or choose from menus but rather is done with mouse clicks over the different parts of the image.

Figure 14:
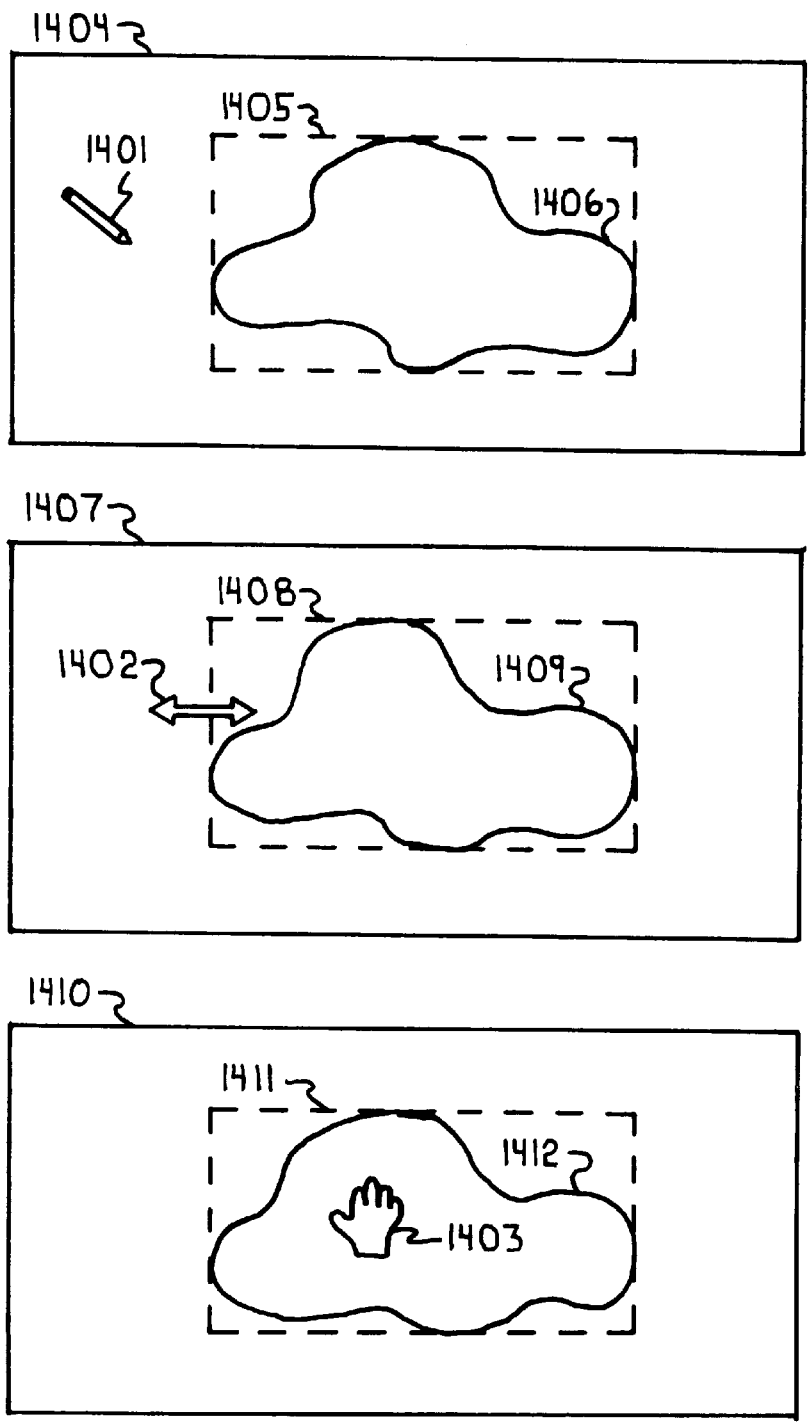
FIG. 14 portrays exemplary cursor shapes during mode changes.

Referring to FIG. 14, the way that the computer program of this invention (referred to as 113 in FIG. 1) includes instructions that provide changes to the cursor shape during mode changes is shown for the preferred embodiment. FIG. 14 shows how when the application is in stretch mode, the shape of the cursor depends upon the location of the cursor relative to the region and the box that contains the region. When the cursor 1401 is inside the image window 1404 and outside of the box 1405 containing the region 1406, the program instructions cause the cursor to assume the shape of a pen to convey to the user that if the mouse is moved with the mouse button pressed, a new region is defined. When the cursor 1402 is inside the image window 1407 and on an edge of the box 1408 containing the region 1409, the program includes instructions that cause the cursor to assume the shape of a double-headed arrow to convey to the user that if the mouse is moved with the mouse button pressed, the region is stretched. When the cursor 1403 is inside the image window 1410 and inside the box 1411 containing the region 1412, the program instructions cause the cursor to assume the shape of a hand to convey to the user that if the mouse is moved with the mouse button pressed, a copy of the region is dragged to another location.

In all cases, the computer program of this invention displays advisory prompts on the bottom of the window to indicate to the user what the current state of the system is and what action is expected.

The foregoing description has been limited to a specific embodiment of this invention. It is apparent, however, that variations and modifications may be made to the invention, with the attainment of some or all of the advantages. For example, it is obvious to those skilled in the art that the present invention can be used as a stand-alone program by simply adding multiple window capability and also adding I/O and additional image processing capabilities by incorporating a graphical tool kit available from many third parties. It is also obvious that the grouping of the tools could be modified (e.g., the region drag and copy functionality could be offered as part of region stretching or region smoothing or even as a separate tool). Also, even though the human form is mentioned as the most likely application for this invention, any object may be manipulated so the invention should not be considered limited to use with just the human form. Therefore, it is the object of the appended claims to cover all such variations and modifications as come within the true spirit and scope of the invention.

Operational Overview

The computer system and article of manufacture of this invention include a computer program that is executed by the processor of a computer system to provide a user interactive graphics system. A user operating the computer program of this invention would operate the computer system in the following manner.

The program of this invention provides a user with a method for warping an image. When warp mode is selected, a sub-control is displayed that presents the options of warping within a vertical rectangle, a horizontal rectangle, a square, and a user-defined warping region. When a warp sub-control for a rectangle is chosen, the cursor assumes an arrow shape and when the mouse button is depressed, a rectangle is drawn on the display around the cursor location along with a smaller rectangle inside the larger rectangle that indicates the extent of cursor movement allowed in order to warp within a box of that size. As the mouse is moved with the mouse button held down, the user is able to visualize the warp effects. When the mouse button is released, the boxes are erased and the changes are applied to the image buffer. When the region-warping sub-tool is selected, the cursor assumes the shape of a pen and the region is defined as the mouse button is depressed. Once the region has been defined, if the cursor enters the region, the cursor assumes the shape of an arrow and when the user moves the mouse with the mouse button held down, the user is able to visualize the image being warped within that region. Actually, the image is warped within the box containing the region and the warp results are masked so that only the area of the image within the region is affected by the warp operation.

The program of this invention provides a user with a method for smoothing an image. When smoothing mode is selected, a sub-control is displayed that presents the option of cursor-type smoothing or region-type smoothing. Cursor-type smoothing allows the user to smooth a small part of the image by holding down the mouse button and moving the mouse or alternatively, by positioning the mouse and clicking the mouse button once. Cursor-type smoothing offers the user a choice of cursor sizes. The cursor size determines how big an area is smoothed. The cursor-type smoothing offers the unique feature of showing the effects of the smoothing through the transparent center rectangle of the cursor frame as smoothing occurs. Cursor-type smoothing also offers intensity choices such as high, medium and low. Low represents averaging with one pixel neighbor in each direction, medium represents two neighbors, and high represents three neighbors in each direction. Region-type smoothing allows the user to define a region and smooth within that region simply by clicking the mouse button while the cursor is within the region. In region-type smoothing, when the cursor is inside the region, the cursor assumes the shape of a finger pressing a mouse button and when the cursor is outside of the region, the cursor assumes the shape of a pen so that a new region can be defined simply by pressing the mouse button and moving the cursor.

The program of this invention provides a user with a method for stretching, flipping, and copying a region of an image. When this mode is selected, a sub-control is displayed that presents a button for region-flip. There is no sub-control required for a copy or stretch operation for this control because the mode is indicated by the location and pattern of the cursor. Initially, the cursor appears as a pen and when the mouse button is depressed, the user can define the region. When the mouse button is released the region is completed automatically (the start and end points are connected) and then the cursor assumes one of three shapes depending upon its location relative to the region just defined. When the cursor is outside of the box containing the region, the cursor assumes the shape of a pen so that if the mouse button is depressed, the existing region is erased and a new region is defined. When the cursor is on the border of the box containing the region, the cursor assumes the shape of a double-headed arrow and when the mouse button is pressed, the region stretches or shrinks in the direction of the mouse movement. Stretching and shrinking are terms that define the same operation and simply reflect whether cursor movement is towards or away from the center of the region. (By working from the corner of the box, the image may easily be stretched in one dimension while simultaneously shrunk in the other dimension. For this reason, the operation is usually referred to simply as stretching but this always implies a shrinking capability also.) If the cursor is over the corners of the box containing the region, the cursor arrow is diagonal pointing towards the center of the box, when the cursor is over the top or bottom edges of the box, the cursor is vertical, and when the cursor is over the sides of the box, the cursor is horizontal. When the cursor is inside the region, the cursor assumes the shape of a hand and when the mouse is moved with the mouse button depressed, a copy of the region is dragged until the mouse button is released. When the flip button is pressed, the data within the region is flipped around an imaginary vertical axis running through the center of the box that holds the region such that each pixel is the same distance from that imaginary vertical axis but is moved to the other side of that axis.

The program of this invention provides a user with a method for presenting image size controls in such a way as they do not conflict with the use of the cursor as the indicator of stretch, smooth or warp mode.

The method of preserving the cursor shape, implemented by the program's instructions, (and therefore the mode) during zooming is significant and novel because in the prior art, a zoom button typically causes the cursor to assume the shape of a magnifying class which the user then positions over the image so that when the user clicks the mouse button, the image is zoomed. The drawback of this prior approach is that when the cursor shape has changed for the zoom operation, it is then necessary for the user to push additional buttons to return to the prior mode. This is disruptive to a convenient and speedy graphical user interface.

There are typically four of these controls that are always available and that require no sub-controls and no changes in cursor shape and processing mode. These include the zoom-in control, the zoom-out control, the full-resolution (or full image size) control and the fit-to-window (or fit image size) control. The full-resolution control restores the image to full resolution (where the dimensions of the image match exactly the dimensions of the stored image data). The fit-to-window control zooms the image to the extent necessary such that one of the image edges fits the window precisely while the other edge is less than or equal to the length of the corresponding window edge. The zoom-in and zoom-out controls function as follows. In order to warp with a larger or smaller warp box, the user has simply to press the zoom-in or zoom-out button until the warp box is the desired size relative to the image. As the image zooms, horizontal and vertical scroll bars appear and disappear as necessary and when the scroll bars are used, the center point of the image remains unchanged while zooming in and out. Likewise, to smooth more precisely, the image is zoomed in and to smooth more coarsely, the image is zoomed out. And to stretch, copy and flip, these operations are performed at any zoom amount. The underlying key is that all changes made to the image are converted to changes for the full resolution image before they are applied.

The program of the invention provides a user with a method for viewing and backing out changes. There are in typically three of these controls that are always available and that require no sub-controls and no changes in cursor shape. These include the undo control, the restore control, and the view original (or toggle) control. The undo control backs out the most recent change to the image. The restore control returns the image to its original state (i.e., before the first change was made). The view original control momentarily shows the original image (i.e., the image as it was most recently read in, typically from disk, the Internet, or a digital camera interface) while the mouse button is pressed and when the mouse button is released, the most recent version of the image is re-displayed. The duration is typically as long as the graphically-displayed toggle button is pressed (i.e., until the user releases the mouse button) but this duration could also be a user-defined time if the computer system does not support reporting when graphical user interface objects such as buttons are deselected.

The program of the invention provides a user with a method to rapidly show changes in real-time. As the user is warping, stretching, copying and flipping, the conventional approach is to update the source image data and then repaint the necessary portions of the screen to reflect the changes. An important shortcut is taken in these cases. While the mouse button is depressed and one of these operations is taking place, all changes are made directly to the display buffer and not to the original image data. Only when the mouse button is released in the case of the warp box or when the cursor is moved outside of the region and the mouse button is depressed are the changes made to the original image buffer. This results in a significant and important increase in the apparent speed of the system.

I claim:

1. A computer system of the type having a processor, a display, a memory, a cursor positioning device, a cursor, a computer program for providing a graphics interface that includes a graphics buffer, and a graphics computer program encoded on said memory and operating on said operating system, said graphics computer program comprising:

first means for displaying at least a portion of a first representation of said digital image on a first area of said display;

second means for displaying on said display at least one selection button for operator selection of graphic control modes; said graphic control modes comprising at least one of a warping mode, a smoothing mode, a stretching mode, an image size control mode, a toggle mode, a restore mode, and an un-do mode;

in which said smoothing mode provides smoothing of said first representation in at least one of an operator selected shape and a cursor having a predetermined shape with a transparent inside section; and said stretching mode provides an operator selected region within said first representation within which the portion of said first representation enclosed by said selected region is at least one of said stretched, shrunken, in any axis, and copied, within said first area; and third means for providing for an operator selection of each graphic control mode.

2. The graphics computer program recited in claim 1 including fourth means for displaying an at least one sub-control button on a second area of said display.

3. The graphics computer program recited in claim 2 wherein said sub-control buttons for said warping mode include at least one button for an operator selection of a shape within which a warping of said first representation is to occur, said shape including at least one of a vertical rectangle warping region, a horizontal rectangle warping region, a square warping region, and a user-defined region.

4. The graphics computer program recited in claim 1 including warping means for providing a warping of said first representation upon said operator selection of said warping mode.

5. The graphics computer program recited in claim 2 wherein said sub-control buttons for said smoothing mode include at least one button for an operator selection of a shape within which a smoothing of said first representation is to occur, said shape including a predetermined shape and a user-defined shape.

6. The graphics computer program recited in claim 5 including means for providing a smoothing of said first representation in said operator selected shape.

7. The graphics computer program recited in claim 5, including at least one button for an operator selection of a cursor size for defining said user-defined shape.

8. The graphics computer program recited in claim 2 wherein said sub-control buttons for said smoothing mode include at least one button for an operator selection of an intensity of said smoothing and including means for providing a smoothing of at least a portion of said first representation in said intensity.

9. The graphics computer program recited in claim 5 including means for providing a smoothing of said first representation in said operator selected shape.

10. The graphics computer program recited in claim 2 wherein said sub-control buttons for said stretching mode include at least a flip control for selecting and providing a rotation of a stretched image and a shrunken image.

11. The graphics computer program recited in claim 1 including means for providing a region within which said first representation is stretched and is smoothed, and providing one of a stretching and a shrinking of said first representation within said region.

12. The graphics computer program recited in claim 1 wherein said image size control includes at least one of:

a full resolution size control, and full resolution means for providing a full resolution display of said first representation within said first area, wherein said full resolution means is provided upon an operator selection of said full resolution size control;

a fit image size control, and fit image means for providing a fitting of said first representation within said first area, wherein said fit image means is provided upon an operator selection of said fit image size control;

a zoom-in size control, and zoom-in means for zooming-in said first representation in said first area, wherein said zoom-in means is provided upon an operator selection of said zoom-in size control; and a zoom-out size control, and zoom-out means for zooming-out said first representation in said first area, wherein said zoom-out means is provided upon an operator selection of said zoom-out size control.

13. The graphics computer program recited in claim 12 wherein said full resolution means includes an operator selected scrolling of said first image within said first area wherein a portion of said first representation is scrolled within said first area.

14. The graphics computer program recited in claim 12 wherein said zoom-out means and said zoom-in means each include respective displayed scroll bars, and said representation remains stationary within said area, and said respective scroll bars change in accordance with said zooming-in and with said zooming-out.

15. The graphics computer program recited in claim 1 wherein said toggle mode includes toggle means for providing an operator selection for changing a representation on said first area from a changed representation to an initial representation, and upon an operator selection, temporarily displaying said initial representation.

16. The graphics computer program recited in claim 1 wherein said restore mode includes restore means for providing an operator selection for changing a representation on said first area from a changed representation to an initial representation, and displaying means for displaying said initial representation upon an operator selection.

17. The graphics computer program recited in claim 1 wherein said undo mode includes undo means for providing an operator selection for changing a representation on said first area from a changed representation to said first representation, and displaying at least a portion of said first representation on said display.

18. The graphics computer program recited in claim 1 including at least one of warping means for warping of said first representation upon said operator selection of said warping mode;

smoothing means for providing smoothing of said first representation in an operator selected shape upon said operator selection of said smoothing mode;

stretching means for providing a region within which said first representation is stretched and providing a stretching of said first representation within said region upon said operator selection of said stretching mode;

shrinking means for providing a region within which said first representation is shrunken and providing one a shrinking of said first representation within said region upon said operator selection of said shrinking mode;

full resolution means for providing a full resolution display of said first representation within said first area, wherein said full resolution means is provided upon an operator selection of said full resolution size control mode;

fit image means for providing a fitting of said first representation within said first area, wherein said fit image means is provided upon an operator selection of said fit image size control mode;

toggle means for providing an operator selection for changing a representation on said first area from a changed representation to an initial representation, and upon an operator selection, temporarily displaying said initial representation, upon an operator selection of said toggle mode;

restore means for providing an operator selection for changing a representation on said first area from a changed representation to an initial representation, and displaying means for displaying said initial representation upon an operator selection of said restore mode; and undo means for providing an operator selection for changing a representation on said first area from a changed representation to said first representation, and displaying at least a portion of said first representation on said display upon said operator selection of said undo mode;

wherein the shape of said cursor is distinct for each of said warping mode, said smoothing mode, said stretching mode, and said shrinking mode, whereby said operator is notified of an operating mode.

19. A computer readable medium encoded with a graphics computer program for execution by a computer system of the type having a processor, a display, a memory, a cursor positioning device, a cursor, and a computer program for providing a graphics interface; said graphics computer program comprising:

first means for displaying at least a portion of a first representation of said digital image on a first area of said display;

second means for displaying on said display at least one selection button for operator selection of graphic control modes; said graphic control modes comprising at least one of a warping mode, a smoothing mode, a stretching mode, an image size control mode, a toggle mode, a restore mode, and an un-do mode;

in which said smoothing mode provides smoothing of said first representation in at least one of an operator selected shape and a cursor having a predetermined shape with a transparent inside section; and said stretching mode provides an operator selected region within said first representation within which the portion of said first representation enclosed by said selected region is at least one of said stretched, shrunken, in any axis, and copied, within said first area; and third means for providing for an operator selection of each graphic control mode.

20. The graphics computer program recited in claim 19 including fourth means for displaying an at least one sub-control button on a second area of said display.

21. The graphics computer program recited in claim 20 wherein said sub-control buttons for said warping mode include at least one button for an operator selection of a shape within which a warping of said first representation is to occur, said shape including at least one of a vertical rectangle warping region, a horizontal rectangle warping region, a square warping region, and a user-defined region.

22. The graphics computer program recited in claim 19 including warping means for providing a warping of said first representation upon said operator selection of said warping mode.

23. The graphics computer program recited in claim 20 wherein said sub-control buttons for said smoothing mode include at least one button for an operator selection of a shape within which a smoothing of said first representation is to occur, said shape including a predetermined shape and a user-defined shape.

24. The graphics computer program recited in claim 23 including means for providing a smoothing of said first representation in said operator selected shape.

25. The graphics computer program recited in claim 23, including at least one button for an operator selection of a cursor size for defining said user-defined shape.

26. The graphics computer program recited in claim 20 wherein said sub-control buttons for said smoothing mode include at least one button for an operator selection of an intensity of said smoothing and including means for providing a smoothing of at least a portion of said first representation in said intensity.

27. The graphics computer program recited in claim 23 including means for providing a smoothing of said first representation in said operator selected shape.

28. The graphics computer program recited in claim 20 wherein said sub-control buttons for said stretching mode include at least a flip control for selecting and providing a rotation of a stretched image and a shrunken image.

29. The graphics computer program recited in claim 19 including means for providing a region within which said first representation is stretched and is smoothed, and providing one of a stretching and a shrinking of said first representation within said region.

30. The graphics computer program recited in claim 19 wherein said image size control includes at least one of:
 a full resolution size control, and full resolution means for providing a full resolution display of said first representation within said first area, wherein said full resolution means is provided upon an operator selection of said full resolution size control;
 a fit image size control, and fit image means for providing a fitting of said first representation within said first area, wherein said fit image means is provided upon an operator selection of said fit image size control;
 a zoom-in size control, and zoom-in means for zooming-in said first representation in said first area, wherein said zoom-in means is provided upon an operator selection of said zoom-in size control; and
 a zoom-out size control, and zoom-out means for zooming-out said first representation in said first area, wherein said zoom-out means is provided upon an operator selection of said zoom-out size control.

31. The graphics computer program recited in claim 30 wherein said full resolution means includes an operator selected scrolling of said first image within said first area wherein a portion of said first representation is scrolled within said first area.

32. The graphics computer program recited in claim 30 wherein said zoom-out means and said zoom-in means each include respective displayed scroll bars, and said representation remains stationary within said area, and said respective scroll bars change in accordance with said zooming-in and with said zooming-out.

33. The graphics computer program recited in claim 19 wherein said toggle mode includes toggle means for providing an operator selection for changing a representation on said first area from a changed representation to an initial representation, and upon an operator selection, temporarily displaying said initial representation.

34. The graphics computer program recited in claim 19 wherein said restore mode includes restore means for providing an operator selection for changing a representation on said first area from a changed representation to an initial representation, and displaying means for displaying said initial representation upon an operator selection.

35. The graphics computer program recited in claim 19 wherein said undo mode includes undo means for providing an operator selection for changing a representation on said first area from a changed representation to said first representation, and displaying at least a portion of said first representation on said display.

36. The graphics computer program recited in claim 19 including at least one of
 warping means for warping of said first representation upon said operator selection of said warping mode;
 smoothing means for providing smoothing of said first representation in an operator selected shape upon said operator selection of said smoothing mode;
 stretching means for providing a region within which said first representation is stretched and providing a stretching of said first representation within said region upon said operator selection of said stretching mode;
 shrinking means for providing a region within which said first representation is shrunken and providing one a shrinking of said first representation within said region upon said operator selection of said shrinking mode;
 full resolution means for providing a full resolution display of said first representation within said first area, wherein said full resolution means is provided upon an operator selection of said full resolution size control mode;
 fit image means for providing a fitting of said first representation within said first area, wherein said fit image means is provided upon an operator selection of said fit image size control mode;
 toggle means for providing an operator selection for changing a representation on said first area from a changed representation to an initial representation, and upon an operator selection, temporarily displaying said initial representation, upon an operator selection of said toggle mode;
 restore means for providing an operator selection for changing a representation on said first area from a changed representation to an initial representation, and displaying means for displaying said initial representation upon an operator selection of said restore mode; and
 undo means for providing an operator selection for changing a representation on said first area from a changed representation to said first representation, and displaying at least a portion of said first representation on said display upon said operator selection of said undo mode;
 wherein the shape of said cursor is distinct for each of said warping mode, said smoothing mode, said stretching mode, and said shrinking mode, whereby said operator is notified of an operating mode.

37. A computer readable medium encoded with a graphics computer program for execution by a computer system of the type having a processor, a display, a cursor positioning device, a cursor, and a computer program for providing a graphics interface that includes a graphics buffer; said graphics computer program comprising:
 first means for displaying at least a portion of a first representation of said digital image on a first area of said display;
 second means for displaying on said display at least one button for operator selection of a warping mode;
 third means for providing for an operator selection of said warping mode;
 fourth means for displaying on said display at least one button for operator selection of at least one first shape within which warping of said first representation occurs;
 fifth means for providing operator-selection of each first shape upon operator selection of said warping mode;
 sixth means for providing and displaying an operator-selected warping position within said first area of said display;
 seventh means for providing and displaying a warping region on said first region superimposed on said first representation, said warping region corresponding to each operator-selected first shape;
 eighth means for providing warping of said first representation on said first area in response to an operator-selection about said warping position within said warping region, wherein a warped said first representation is displayed on said first area; and
 ninth means for storing a digital representation of said warped said first representation within said memory.

38. The graphics computer program recited in claim 37 wherein said ninth means memory includes said graphics buffer.

39. The graphics computer program recited in claim 37 wherein each button for operator-selection of at least one first shape within which warping of said first representation occurs is displayed within a second area of said display.

40. The graphics computer program recited in claim 37 wherein said first shape for operator-selection includes at least one of a vertical rectangle region, a horizontal rectangle region, a square region, and a user-defined region.

41. The graphics computer program recited in claim 37 wherein said warping region has a shape and said cursor includes a shape according to said warping region shape.

42. The graphics computer program recited in claim 37 wherein said warping region has a rectangular shape and said cursor has an arrow shape.

43. The graphics computer program recited in claim 37 wherein said sixth means includes said cursor positioning device determining said operator-selected warping position.

44. The graphics computer program recited in claim 37 wherein said operator-selected warping position is indicated by a cursor position.

45. The graphics computer program recited in claim 37 wherein said fifth means for providing operator-selection of said first shape includes said cursor positioning device determining said operator-selected first shape.

46. The graphics computer program recited in claim 37 wherein said first shape for operator-selection includes at least one of a vertical rectangle shape, horizontal rectangle shape, a square shape, and a user-defined shape; and said seventh means further includes means for:

providing a vertical rectangle warping region that corresponds to said vertical rectangle shape;

providing a horizontal rectangle warping region that corresponds to said horizontal rectangle shape;

providing a square warping region that corresponds to said square shape; and providing a user-defined warping region congruent to said user-defined region that corresponds to said user-defined shape.

47. The graphics computer program recited in claim 37 wherein said seventh means further includes means for displaying a cursor region that indicates the extent of cursor movement corresponding to warping within said warping region.

48. The graphics computer program recited in claim 37 further including tenth means for ceasing displaying said warping region according to operator input.

49. The graphics computer program recited in claim 37 wherein said seventh means further includes means for displaying a cursor region that indicates the extent of cursor movement corresponding to warping within said warping region, and further including ceasing displaying said cursor region according to operator input.

50. The graphics computer program recited in claim 37 wherein said first shape includes a user-defined region, and further including ninth means for defining said user-defined region on said first area including providing and displaying a closed shape according to a track of cursor position according to said operator input and superimposing said user-defined region on said first representation.

51. The graphics computer program recited in claim 37 wherein said memory includes an image buffer and a graphics buffer, said computer program further includes twelfth means for providing operator-selection of a completion of said warping and for providing setting a flag when an operator selects said completion, and wherein said ninth means further includes storing said warped first representation in said image buffer if said flag is set, and storing said warped first representation in said graphics buffer if said flag is not set.

52. A computer readable medium encoded with a graphics computer program for smoothing a digital image for operation on a computer system of the type having a processor, a display, a memory, a cursor positioning device, a cursor, and a computer program for providing a graphics interface that includes a graphics buffer; said graphics computer program comprising:

first means for displaying on a first area of said display at least a portion of a first representation of said digital image, said first representation comprising contiguous sub-portions; and second means for displaying on said display at least one button for selection of a smoothing mode, in which said smoothing mode provides smoothing of said first representation in at least one of an operator selected shape and a cursor having a predetermined shape with a transparent inside section; and third means for providing for an operator selection of said smoothing mode.

53. The graphics computer program recited in claim 52 including fourth means for displaying at least one button for a cursor mode and a region mode upon operator selection of said smoothing mode; and fifth means for providing for an operator selection of said cursor mode and said region mode upon operator selection of said smoothing mode.

54. The graphics computer program recited in claim 53 further including sixth means for displaying on said display for said cursor mode at least one button for selection of cursor size.

55. The graphics computer program recited in claim 54 further including seventh means for displaying on said display at least one button for selection of cursor size for said cursor mode, said cursor size including at least one of a small cursor size, a medium cursor size, and a large cursor size.

56. The graphics computer program recited in claim 53 further including eighth means for displaying on said display for said cursor mode at least one button for selection of cursor intensity.

57. The graphics computer program recited in claim 53 further including ninth means for displaying on said display for said cursor mode at least one button for selection of cursor intensity, said cursor intensity including at least one of a low cursor intensity, a medium cursor intensity, and a high cursor intensity.

58. The graphics computer program recited in claim 53 further including tenth means for defining a region shape by providing and displaying on said first area according to a track of cursor position according to operator input and superimposing said user-defined region on said first representation, for said region mode.

59. The graphics computer program recited in claim 58 wherein said tenth means further includes means for displaying a first shape for said cursor when said cursor is defining said region shape, and for displaying a second shape for said cursor when said cursor is within said defined shape.

60. The graphics computer program recited in claim 52 further including eleventh means for providing and displaying a region shape on said first area according to a first operator input, and ninth means for smoothing within said region shape according to a second operator input, for said region mode.

61. The graphics computer program recited in claim 60 further including thirteenth means for storing a digital representation of said smoothed shape within said graphics buffer.

62. A computer readable medium encoded with a graphics computer program for stretching and shrinking a digital image and for operation on a computer system of the type having a processor, a display, a memory, a cursor positioning device, a cursor, and a computer program for providing a graphics interface that includes a graphics buffer; said graphics computer program comprising:

first means for displaying at least a portion of a first representation of said digital image on a first area of said display;

second means for displaying on said display at least one button for selection of a stretching mode;

third means for providing for an operator-selection of said stretching mode;

fourth means for providing and displaying in said first area superimposed on said first representation, operator-positioning of said cursor including an initial position of said cursor, a track of said cursor position, and a final position of said cursor and indicating an initial position of said cursor upon operator selection of said stretching mode;

fifth means for providing and displaying operating indication of an end of said positioning;

sixth means for providing and displaying of a closed track consisting of said track and a straight line from said final position to said initial position, defining within said closed track a stretching-shrinking region;

seventh means for providing and displaying a smallest horizontal rectangle enclosing said stretching-shrinking region;

eighth means for providing and displaying operator-positioning of said cursor on at least one of a top right corner of said rectangle, a bottom right corner of said rectangle, a bottom left corner of said rectangle, a top left corner of said rectangle, a top horizontal boundary of said rectangle, a right vertical boundary of said rectangle, a bottom horizontal boundary of said rectangle, and a left vertical boundary of said rectangle; and ninth means for providing and displaying operator-positioning of said cursor from at least of an initial position of said cursor on each vertical boundary to a final position of said cursor, and providing and displaying horizontal stretching of said first representation within said stretching-shrinking region determined by a horizontal distance from said initial position away from said rectangle to said final position, and providing and displaying horizontal shrinking of said first representation within said stretching-shrinking region determined by a horizontal distance from said initial position toward said rectangle to said final position; forming a stretched-shrunken image of said first representation within said stretching-shrinking region;

an initial position of said cursor on each horizontal boundary to a final position of said cursor, and providing and displaying vertical stretching of said first representation within said stretching-shrinking region determined by a vertical distance from said initial position away from said rectangle to said final position, and providing and displaying vertical shrinking of said first representation within said stretching-shrinking region determined by a vertical distance from said initial position toward said rectangle to said final position; forming a stretched-shrunken image of said first representation within said stretching-shrinking region; and an initial position of said cursor on each corner to a final position of said cursor, and providing and displaying horizontal stretching of said first representation within said stretching-shrinking region determined by a horizontal distance from said initial position away from said rectangle to said final position, providing and displaying horizontal shrinking of said first representation within said stretching-shrinking region determined by a horizontal distance from said initial position toward said rectangle to said final position, providing and displaying vertical stretching of said first representation within said stretching-shrinking region determined by a vertical distance from said initial position away from said rectangle to said final position, and providing and displaying vertical shrinking of said first representation within said stretching-shrinking region determined by a vertical distance from said initial position toward said rectangle to said final position; forming a stretched-shrunken image of said first image within said stretching-shrinking region.

63. The graphics computer program recited in claim 62 wherein said graphics computer program further includes means for storing said stretched first representation within said graphics buffer and means for storing said shrunken first representation with said graphics buffer.

64. The graphics computer program recited in claim 62 wherein said graphics computer program further includes tenth means for providing and displaying operator-positioning of said cursor outside of said stretching-shrinking region, providing and displaying an operator-selected position of said cursor outside of said stretching-shrinking region, and providing and displaying a copy of said stretched-shrunken image at said operator-selected position.

65. The graphics computer program recited in claim 62 wherein said graphics computer program further includes eleventh means for providing a flip button on said display, said flip button providing a rotation mode and providing and displaying a rotation of said stretched-shrunken region about an axis of said stretching-shrinking region that is copied to an operator-selected area on said first image outside said stretching-shrinking region.

66. The graphics computer program recited in claim 65 further including means for storing said rotation of said stretched-shrunken region within said graphics buffer.

67. The graphics computer program recited in claim 62 wherein said graphics computer program further includes twelfth means for providing a flip button on said display for operator selection of a flip of said stretched-shrunken area.

68. The graphics computer program recited in claim 67 further including means for storing said flip of said stretched-shrunken region within said graphics buffer.

69. The graphics computer program recited in claim 62 wherein said graphics computer program further includes thirteenth means for providing and displaying a rotation of said stretched-shrunken region about an axis of said stretching-shrinking region that is copied to an operator-selected area on said first image outside said stretching-shrinking region.

70. The graphics computer program recited in claim 69 further including means for storing said rotation of said stretched-shrunken region copied to said operator-selected area within said graphics buffer.

71. The graphics computer program recited in claim 62, wherein said fourth means further includes displaying said cursor in a distinct shape.

72. The graphics computer program recited in claim 62 wherein said eighth means further includes displaying said cursor in a distinct shape according to said position of said cursor.

73. The graphics computer program recited in claim 62 further including fourteenth means for providing and displaying in said first area outside of said stretching-shrinking region, superimposed on said first representation, operator-positioning of said cursor including an initial position of said cursor, a track of said cursor position, and a final position of said cursor and indicating an initial position of said cursor; and for providing and displaying operator indication of an end of said positioning; and for providing and displaying of a closed track consisting of said track and a straight line from said final position to said initial position, defining within said closed track a stretching-shrinking region replacing said stretching-shrinking region of said fifth means.

74. A computer readable medium encoded with a graphics computer program for providing at least one of a full image size control, a fit image size control, a zoom-in image size control, and a zoom-out image size control operating on a computer system of the type having a processor, a display, a memory, a cursor positioning device, a cursor, and a computer program for providing a graphics interface that includes a graphics buffer; said graphics computer program comprising:

first means for displaying a first representation of a digital image on a first area of said display;

second means for providing and displaying at least one button for operator selection of an image size control including at least one of a full image size control, a fit image size control, a zoom-in image size control, and a zoom-out image size control;

wherein when said full image size control button is provided and displayed, and when said first area is sized so that only at most a portion of said first representation at full resolution can be displayed within said first area at a time, said second means further includes third means for providing operator selection of said full size image control, and said first means further includes fourth means for displaying at full resolution a portion of said first representation within said first area, and fifth means for providing operator selected scrolling of said first image within said first area wherein a portion of said first representation is scrolled within said first area;

and when said fit image size control button is provided and displayed, wherein said first area is sized so that one of three display conditions is present, a first display condition in which said first representation at full resolution is the same size as said first area, a second display condition in which said first representation at full resolution is larger in at least one of a horizontal dimension and a vertical dimension than a respective horizontal and vertical dimension of said first area, and a third condition in which said first representation at full resolution is smaller in each dimension than said respective dimension of said first area, said second means further includes sixth means for providing operator selection of said fit image size control, said first means further includes seventh means for determining which of said three display conditions is present and a measure by which said first representation horizontal and vertical dimensions differ from said respective horizontal and vertical dimension of said first area, eighth means for displaying said first representation at full resolution within said first area when said first display condition is determined by said seventh means, ninth means for a zooming-in said first representation to a precise fit of said dimension of said first area by a largest measure, within said first area when said second display condition is determined by said seventh means, and tenth means for a zooming-out of said first representation to a precise fit of said dimension of said first area that is closest to said respective horizontal or vertical dimension of said first area, within said first area when said third display condition is determined by said seventh means.

75. The graphics computer program recited in claim 74, further including means for storing a full resolution display of said first representation within said first area, within said graphics buffer.

76. The graphics computer program recited in claim 74, wherein when said full image size control button is provided and displayed, and when said first area is sized so that only at most a portion of said first representation at full resolution can be displayed within said first area at a time, wherein said fifth means includes horizontal scrolling and vertical scrolling, said horizontal scrolling including displaying a horizontal scrolling bar on said display for operator control of said horizontal scrolling and said vertical scrolling includes displaying a vertical scroll bar on said display for operator control of said vertical scrolling.

77. The graphics computer program recited in claim 74, wherein when said full image size control button is provided and displayed and when said first area is sized so that only at most a portion of said first representation at fill resolution can be displayed within said first area at a time, said fifth means includes providing at least one of operator selected horizontal scrolling of said first image within said first area wherein a portion of said first representation is horizontally scrolled within said first area, and vertical scrolling of said first image within said first area wherein a portion of said first representation is vertically scrolled within said first area.

78. The graphics computer program recited in claim 74, wherein when said full image size control button is provided and displayed and when said first area is sized so that only at most a portion of said first representation at full resolution can be displayed within said first area at a time, said fifth means includes providing at least one of
operator selected horizontal scrolling of said first image within said first area wherein a portion of said first representation is horizontally scrolled within said first area, wherein said horizontal scrolling includes displaying a horizontal scrolling bar on said display for operating control of said horizontal scrolling, and operator selected vertical scrolling of said first image within said first area wherein a portion of said first representation is vertically scrolled within said first area, wherein said vertical scrolling includes displaying a vertical scrolling bar on said display for operating control of said vertical scrolling.

79. The graphics computer program recited in claim 74, further including means for storing said displayed first representation at full resolution within said graphics buffer.

80. The graphics computer program recited in claim 74 wherein said second means further includes means for providing operator selection of said zoom-in image size control; and said first means further includes means for zooming-in said first representation in said first area.

81. The graphics computer program recited in claim 74, wherein said second means further includes means for providing operator selection of said zoom-out image size control; and said first means further includes means for zooming-out said first representation in said first area.

82. A computer readable medium encoded with a graphics computer program for viewing and backing out changes to a representation on a display for operating on a computer system of the type having a processor, said display, a memory, a cursor positioning device, a cursor, and a computer program for providing a graphics interface that includes a graphics buffer; said graphics computer program comprising:

first means for displaying at least a portion of a representation of a displayed image on a first area of said display, said displayed representation defining an initial image;

second means for graphically changing a first representation of a digital image on said first area to a changed representation and displaying said changed representation, said changes comprising at least one of warping, smoothing, and stretching, said changes defining a changed representation, in which said smoothing mode provides smoothing of said first representation in at least one of an operator selected shape and a cursor having a predetermined shape with a transparent inside section; and said stretching mode provides an operator selected region within said first representation within which the portion of said first representation enclosed by said selected region is at least one of said stretched, shrunken, in any axis, and copied, within said first area; and third means for providing at least one of toggle means for providing an operator selection for changing a representation on said first area from said changed representation to said initial representation, and upon said operator selection, temporarily displaying said initial representation;

restore means for providing an operator selection for changing a representation on said first area from said changed representation to said initial representation, and displaying means for displaying said initial representation rather than said changed representation upon said operator selection; and undo means for providing an operator selection for changing a representation on said first area from said changed representation to said first representation, and displaying at least a portion of said first representation on said display.

83. The graphics computer program recited in claim 82 wherein said first means includes storing said initial representation in a first image buffer, a second image buffer, and a third image buffer;

said second means includes fourth means for storing a contents of said graphically changing first representation within said graphics buffer and upon an operator selection, fifth means for storing said contents of said first image buffer in said second image buffer and subsequently storing a contents of said graphics buffer in said first image buffer;

said toggle means includes storing said contents of said third image buffer in said graphics buffer upon said toggle means operator selection and subsequently, after said temporarily displaying, storing a contents of said first image buffer in said graphics buffer, wherein a period of said temporarily displaying is defined by one of a predetermined time and an operator selection;

said restore means includes storing said contents of said third image buffer in said second image buffer and said first image buffer and said graphics buffer; and said undo means includes storing said contents of said second image buffer in said first image buffer and in said graphics buffer.

84. The graphics computer program recited in claim 82 further including an operator selection means for operator selection of at least one of said toggling means, said restore means, and said undo means; including displaying on said display at least one button for operator selection of said toggling means, said restore means, and said undo means.

85. The graphics computer program recited in claim 82 wherein said toggle means includes at least one of providing operator selection for displaying said initial representation for a predetermined time period and displaying said initial representation for said predetermined time period, and providing operator selection for displaying said initial representation for a time period determined by said operator and displaying said initial representation for said time period determined by said operator.

86. The graphics computer program recited in claim 85 wherein said providing for operator selection for displaying said initial representation for a time period includes providing means for monitoring a depression of a mouse button.

* * * * *